United States Patent [19]
Ozawa et al.

[11] Patent Number: 5,623,426
[45] Date of Patent: Apr. 22, 1997

[54] FAILURE DIAGNOSING SYSTEM FOR ABSORPTION CHILLERS

[75] Inventors: Yoshio Ozawa, Hirakata; Masashi Yasuda, Neyagawa; Yasuharu Kurogi; Kazuaki Mizukami, both of Hirakata; Hiroyuki Suzuki, Osaka; Masahiro Furukawa; Yasushi Kamada, both of Ora-gun, all of Japan

[73] Assignee: Sanyo Electric Co., Ltd., Osaka, Japan

[21] Appl. No.: 392,332

[22] Filed: Feb. 22, 1995

[30] Foreign Application Priority Data

| Feb. 23, 1994 | [JP] | Japan | 6-025045 |
| May 30, 1994 | [JP] | Japan | 6-140855 |
| May 30, 1994 | [JP] | Japan | 6-140856 |
| May 19, 1994 | [JP] | Japan | 6-131404 |
| Jul. 18, 1994 | [JP] | Japan | 6-187755 |
| Jul. 18, 1994 | [JP] | Japan | 6-187756 |
| Jul. 18, 1994 | [JP] | Japan | 6-187757 |

[51] Int. Cl.$^6$ ............................. F25B 49/04
[52] U.S. Cl. ............. 364/557; 364/505; 364/185; 364/186; 364/551.01; 62/107; 62/108; 62/109; 62/101
[58] Field of Search ............. 364/557, 185, 364/186, 505, 551.01; 371/29.1; 340/346.79; 62/107, 108, 109, 101

[56] References Cited

U.S. PATENT DOCUMENTS

| 4,381,549 | 4/1983 | Stamp, Jr. et al. | 364/557 |
| 4,660,386 | 4/1987 | Hansen et al. | 364/185 |
| 5,083,438 | 1/1992 | McMuliin | 364/551.01 |
| 5,174,364 | 12/1992 | Mizuno | 165/13 |
| 5,301,743 | 4/1994 | Mizuno | 165/12 |

*Primary Examiner*—Emanuel T. Voeltz
*Assistant Examiner*—Hien Vo
*Attorney, Agent, or Firm*—Nikaido, Marmelstein, Murray & Oram LLP

[57] ABSTRACT

A failure diagnosing system for an absorption chiller including an evaporator, absorber, etc. comprises a plurality of sensors for measuring at least one representative temperatures of each of two fluids participating in heat exchange in a specified heat exchange unit, and an arithmetic unit for receiving measurement data from the sensors. The arithmetic unit comprises a circuit for calculating an actual temperature difference using a simple calculation equation defined by a linear expression, a circuit for calculating the amount of heat exchange by the absorber, and a circuit for calculating the degree of abnormality of the absorber by comparing the actual temperature difference with an ideal temperature difference for the same amount of heat exchange as the calculated amount.

17 Claims, 16 Drawing Sheets

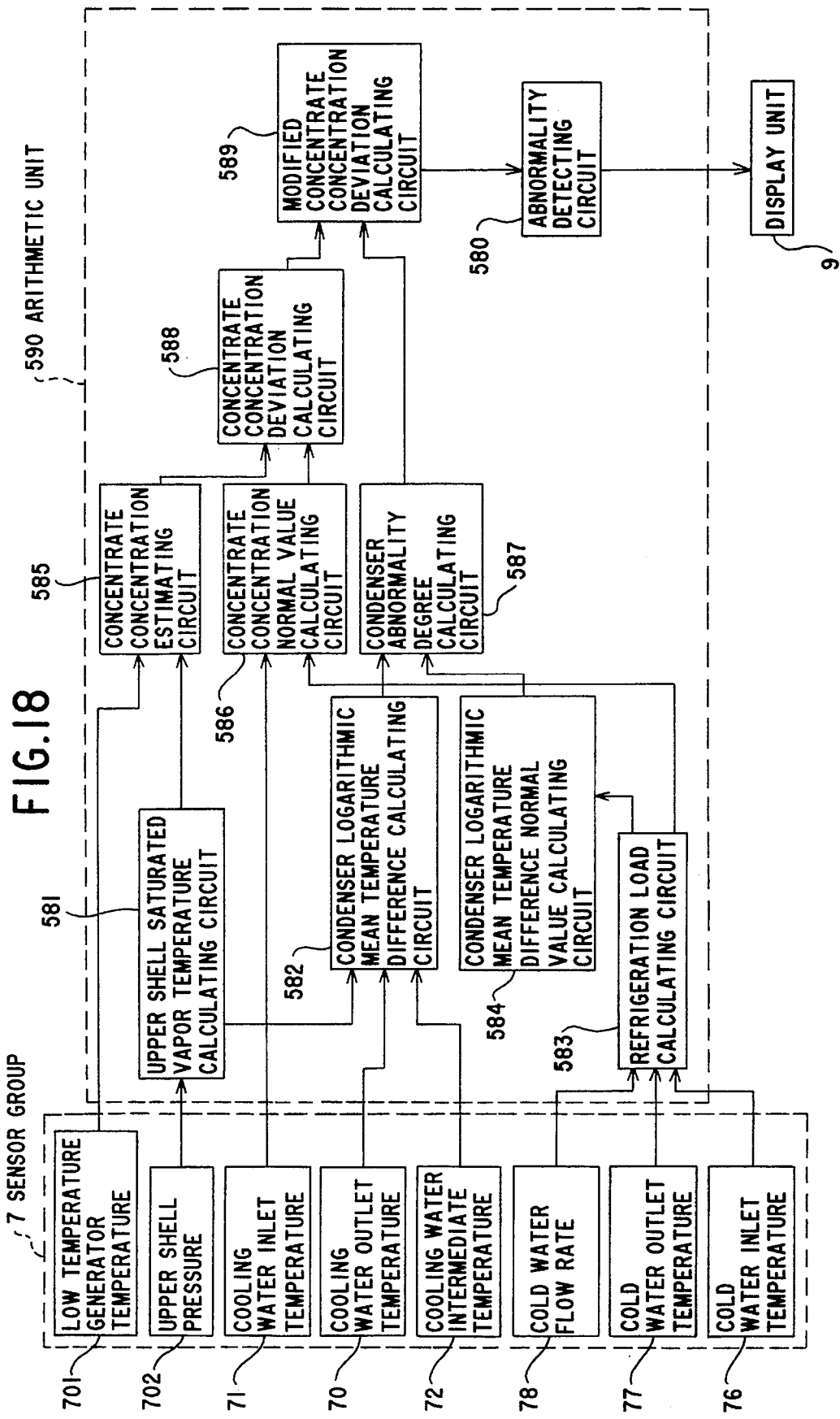

FAILURE DIAGNOSING SYSTEM FOR ABSORPTION CHILLERS

FIELD OF THE INVENTION

The present invention relates to absorption chillers, and more particularly to a system for diagnosing failures of the main assembly of a chiller by identifying abnormalities occurring in various portions of the chiller.

BACKGROUND OF THE INVENTION

FIG. 21 shows an absorption chiller which comprises a condenser 11 and low temperature generator 12 arranged in an upper shell 1, an evaporator 21 and absorber 22 arranged in a lower shell 2, a high temperature generator 3 incorporating a burner 31, a high temperature heat exchanger 4, low temperature heat exchanger 5, etc. These components are interconnected by piping to recycle an absorbent through the high temperature generator 3, low temperature generator 12 and absorber 22 by an absorbent pump 6 and realize refrigeration cycles. Cooling water from a cooling tower (not shown) flows through cooling water piping extending through the absorber 22 and condenser 11. The supply of fuel gas to the burner 31 is adjusted to maintain at a target value the temperature of cold water to be supplied from the evaporator 21.

Foulness of the cooling water, an abnormal amount of recycling of the absorbent, abnormal vacuum, contamination of the refrigerant with the absorbent and like abnormalities are likely to occur in the absorption chiller.

When the cooling water becomes fouler, extraneous matter such as dirt adheres to the inner surface of the cooling water piping to result in a lower coefficient of heat transfer, and the condenser 11 and the absorber 22 fail to produce a sufficient cooling effect to result in impaired refrigeration capacity. If contaminated with the absorbent, the refrigerant exhibits a lower boiling point, consequently reducing the internal pressure of the lower shell 2 to lower the capacity of the evaporator 21 and the absorber 22. A reduction in the vacuum in the lower shell 2 also impairs the capacity of the evaporator 21 and the absorber 22.

It is therefore practice to monitor variations in logarithmic mean temperature differences in heat exchanger units such as evaporator 21, absorber 22 and condenser 11 in order to diagnose abnormalities in the interior of the chiller. Thermocouples, thermistors or like temperature sensors are attached to the inlet and outlet of these heat exchange units for measuring the fluid temperature at the inlet and outlet of each unit. Further the refrigerant is checked for contamination with the absorbent by drawing off the refrigerant trapped in the lower shell 2 and measuring the specific gravity of the refrigerant.

On the other hand, we have proposed a method of diagnosing failures based on an abnormality degree A defined by the following mathematical expression 1 as an index representing the degree of abnormality of heat exchange units.

Mathematical Expression 1:

$$A=(\Delta T-\Delta Tn)/\Delta Tn$$

wherein $\Delta T$ is an actual logarithmic mean temperature difference (measured value) obtained by measurement, and $\Delta Tn$ is an ideal logarithmic mean temperature difference (normal value).

However, the following problems are encountered with conventional absorption chillers.

(1) Calculation of the logarithmic mean temperature difference and the degree of abnormality requires 3 to 4 temperature sensors for one heat exchange unit, so that the entire main assembly of the chiller needs to be equipped with a considerable number of temperature sensors if the required sensors are to be mounted on all the heat exchange units. Moreover, the calculation of the logarithmic temperature difference requires a computer program and memory for logarithmic calculation to entail the problem of necessitating a circuit of increased scale.

(2) While the abnormality degree of the absorber 22 is an important index in detecting various abnormalities, cooling water flows through the absorber and therefore exerts a great influence if fouling. Nevertheless, even while the chiller is in continued normal operation, the foulness of the cooling water increases with the operating time, so that an increase in the abnormality degree of the absorber can not be interpreted as indicating occurrence of some abnormality other than fouling of the cooling water. Thus, in diagnosing a failure based on the abnormality degree of the absorber, it is conventionally impossible to make distinction between fouling of the cooling water and other cause, and difficulty is encountered in detecting a truly objectionable abnormality such as contamination of the refrigerant or an abnormal vacuum.

(3) If the concentration (concentrate concentration) of the absorbent (lithium bromide solution) to be supplied from the low temperature generator 12 to the absorber 22 via the low temperature heat exchanger 5 exceeds a definite value, the absorbent crystallizes to cause trouble to the operation. The conventional chiller is accordingly equipped with a safety device for monitoring the concentration of the absorbent at all times and discontinuing the operation of the chiller upon the concentration exceeding the definite value. Since measuring the concentrate concentration necessitates an expensive concentration meter, the Dühring diagram shown in FIG. 7 is usually used to estimate the concentration based on the saturated vapor temperature Tcond of the condenser 11 and the absorbent temperature Ts_hi at the outlet of the low temperature generator 12 as actually measured.

More specifically, the concentrate concentration is determined with reference to the Dühring diagram by locating the intersection of the saturation pressure Ps of water corresponding to the saturated vapor temperature Tcond and the absorbent temperature Ts_hi and reading the concentration Ds at the intersection. Since the saturated vapor temperature Tcond can not be determined accurately by directly measuring the temperature of the vapor flowing through the upper shell 1, the temperature Tcond is calculated from the measurement of internal pressure Pup of the upper shell 1 with reference to the Dühring diagram of FIG. 7.

However, the method of calculating the saturated vapor temperature Tcond from the internal pressure Pup of the upper shell 1 still has the problem that the pressure sensor is more expensive than the thermometer and difficult to maintain.

On the other hand, an operation monitoring system has been proposed for calculating the concentrate concentration in theoretical cycles based on the temperature measurements of various portions (Examined Japanese Patent Publication SHO 63-297970), whereas since the system operates on the premise of the theoretical cycle, the difference between the calculated concentration and the concentration in the actual chiller is great to entail the problem that it is difficult to accurately detect abnormal concentrations.

SUMMARY OF THE INVENTION

An object of the present invention is to provide a failure diagnosing system for absorption chillers which has a simple contruction and yet is adapted to detect abnormalities in a specified heat exchange unit constituting the main assembly of the chiller.

The present invention provides a failure diagnosing system for an absorption chiller which system comprises temperature measuring means for measuring at least one representative temperature of each of two fluids participating in heat exchange at a specified heat exchange unit, temperature difference data calculating means for storing a temperature difference data calculating equation comprising a linear expression containing the representative temperatures of the two fluids as its factors and using the calculating equation to calculate actual temperature difference data from the measurement data obtained by the measuring means, heat exchange amount deriving means for deriving by measuring and calculation the amount of heat exchange by the specified heat exchange unit or other amount of heat exchange which varies with said amount of heat exchange, storage means having stored therein ideal temperature difference data for normal operation as related to the amount of heat exchange, and abnormality identifying means for preparing abnormality data indicating an abnormality of the specified heat exchange unit by comparing the actual temperature difference data obtained by the temperature difference calculating means with the ideal temperature difference data for the same amount of heat exchange as the amount of heat exchange obtained by the heat exchange amount deriving means.

As an index for evaluating an abnormality of the heat exchange unit, the failure diagnosing system described above uses temperature difference data defined by a simple linear expression in place of the coventional logarithmic mean temperature difference. The temperature difference data can be, for example, the difference between the inlet temperature Ta_in of the absorbent (concentrate) to be sprayed into the absorber and the outlet temperature Tco_mid of cooling water flowing out therefrom, i.e., Ta_in-Tco_mid.

In evaluating the heat exchange efficiency of heat exchange units absolutely, the logarithmic mean temperature difference is an appropriate evaluation index, whereas for the purpose of diagnosing failures of absorption chillers, it is reasonable to compare the logarithmic mean temperature difference of the heat exchange unit with a corresponding value thereof during normal operation for relative evaluation. In this case, the significance of the logarithmic mean temperature difference as an absolute value is small.

On the other hand, temperature difference data defined by a linear expression of representative temperatures of the cooling water and absorbent through the absorber, like the foregoing temperature difference data, is not always very significant as an absolute value but can be an appropriate index in the case where relative evaluation is to be made for the purpose of diagnosing failures of the absorption chiller.

With attention directed to this point according to the present invention, representative temperatures of the cooling water and absorbent through the absorber are measured, and temperature difference data is calculated from the measurement data and then compared with ideal temperature difference data for the same amount of heat exchange to calculate abnormality data. The abnormality data represents a degree of abnormality relative to the normal state of operation.

The actual temperature difference data needs to be compared with the ideal temperature difference data for the same amount of heat exchange. With a specific embodiment of the invention, the difference between the inlet and outlet temperatures of the cooling water through the absorber is multiplied by the flow rate of the water to calculate the amount of heat exchange by the absorber.

Usable as the abnormality data is the afore-mentioned abnormality degree A proposed by the present applicant. Even when the load is low in this case, the abnormality degree is calculated according to the load, and the abnormality is determined based on the abnormality degree. For example in preparation for a high-load operation during summer, it is possible to inspect and maintain the chiller early and to thereby avoid cessation of the operation under a high load.

The failure diagnosing system of the present invention for the absorption chiller uses temperature difference data defined by a simple linear expression in place of the conventional logarithmic mean temperature difference, so that representative temperature measurement providing a basis for the calculation of the temperature difference data can be made at 2 or 3 points. The number of temperature sensors used is therefore smaller than is conventionally needed. Moreover, the temperature difference data can be calculated from the linear expression only without necessitating logarithmic calculation conventionally needed, so that the circuit can be smaller in scale to render the entire chiller simple in construction.

Another object of the invention is to provide a failure diagnosing system which is adapted to exclude the influence of foul cooling water when detecting abnormality of the absorber.

The present invention provides another failure diagnosing system for absorption chillers which comprises sensor means for measuring the temperature of a plurality of fluids participating in heat exchange in a condenser and an absorber, an arithmetic circuit for calculating condenser abnormality degree data and absorber abnormality degree data representing the abnormality degree of the condenser and that of the absorber by calculating condenser temperature difference data and absorber temperature difference data representing the mean temperature differences of the fluids through the respective condenser and absorber based on measurement data obtained by the sensor means and comparing each of these items of data with a corresponding normal value, absorber abnormality degree modifying means for modifying the calculated absorber abnormality degree data in accordance with the magnitude of the calculated condenser abnormality degree data, and failure identifying means for identifying a failure of the absorber based on the modified absorber abnormality degree data.

With the absorption chiller, the cooling water passes through the absorber and then through the condenser. Accordingly, if the cooling water fouls, the resulting influence appears not only in the absorber but also in the condenser.

Since the absorber is generally provided in a lower shell along with the evaporator, the vapor resulting from evaporation and the absorbent are related to the abnormality of the absorber in a complex fashion. On the other hand, the condenser is provided in an upper shell and separated from the absorber by a partition, and is therefore free from the influence of an abnormal vacuum in the absorber or contamination of the refrigerant. The cause for an abnormality of the condenser is predominantly the foulness of the cooling water. In other words, the abnormality degree of the condenser serves as an appropriate index indicating the progress of foulness of the cooling water.

According to the present invention, therefore, condenser abnormality degree data and absorber abnormality degree data representing the abnormality degree of the condenser and that of the absorber are calculated to modify the latter data in accordance with the magnitude of the former data. The amount of modification of the data can be calculated, for example, by multiplying the condenser abnormality degree data by a correction coefficient. In this case, the amount of modification is subtracted from the absorber abnormality degree data to obtain modified absorber abnormality degree data.

Regardless of an increase in the foulness of the cooling water, the modified data varies with an abnormality other than the foulness of the cooling water, such as abnormal vacuum or contamination of the refrigerant, to serve as an appropriate index indicating the degree of such abnormality.

The failure diagnosing system of the invention for the absorption chiller is adapted to exclude the influence of foulness of cooling water when detecting the abnormality of the absorber, hence a highly reliable failure diagnosis.

Another object of the invention is to accurately detect an abnormal concentration of absorbent based on measurements obtained with use of thermometers without using pressure sensors.

Still another object of the invention is to provide a failure diagnosing system which is adapted to properly and rapidly check the refrigerant for contamination with the absorbent without sampling the refrigerant.

BRIEF DESCRIPTION OF THE DRAWINGS

FIG. 18 is a block diagram showing the construction of an eighth embodiment;

DETAILED DESCRIPTION OF EMBODIMENTS

With reference to the drawings, a detailed description will be given of several embodiments of the present invention as practiced for the absorption chiller shown in FIG. 21.

Figure 21:
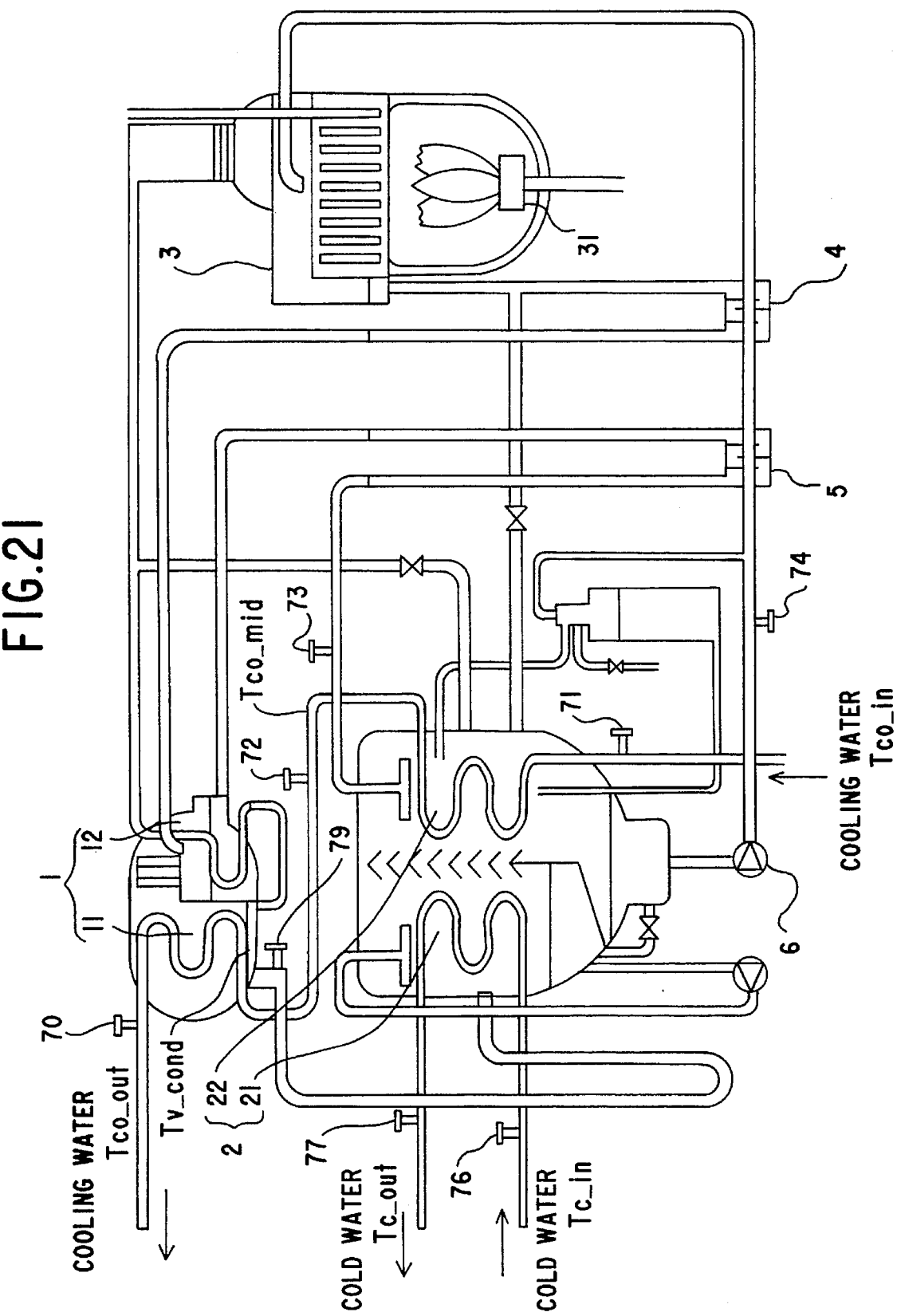
FIG. 21 is a diagram showing the construction of an absorption chiller for which the invention is practiced.

In the absorption chiller of FIG. 21, water is used as the refrigerant, and lithium bromide as the absorbent. The refrigerant is evaporated in the high temperature generator 3, flows into the condenser 11 via the low temperature generator 12, liquefies on condensation through heat exchange with cooling water flowing through the condenser, and thereafter flows toward the evaporator 21. The liquid refrigerant evaporates through heat exchange with cold water flowing through the evaporator 21, and the cold water flowing through the evaporator 21 is cooled with the resluting heat of vaporization.

The vapor of refrigerant produced by the evaporator 21 is absorbed by the absorbent in the absorber 22. The absorbent diluted by the absorption of the refrigerant is sent through the low temperature heat exchanger 5 and high temperature heat exchanger 4 to the high temperature generator 3 by the absorbent pump 6. The absorbent sent to the generator 3 is heated by the burner 31, permitting the refrigerant to evaporate off. The absorbent thus concentrated to a medium concentration flows through the high temperature heat exchanger 4 into the low temperature generator 12, in which the absorbent is heated with the refrigerant vapor from the high temperature generator 3 and further concentrated by the removal of refrigerant vapor. The absorbent having a high concentration is sent through the low temperature heat exchanger 5 to the absorber 22 and sprayed.

The piping connected to the heat exchange units such as the absorber 22, evaporator 21 and condenser 11 is provided with a group of sensors for measuring the temperature and flow rate of the fluids participating in heat exchange in each unit. The sensor group includes a cooling water inlet temperature sensor 71, cooling water intermediate temperature sensor 72, absorbent inlet temperature sensor 73, absorbent outlet temperature sensor 74, cold water inlet temperature sensor 76, cold water outlet temperature sensor 77, condensed refrigerant temperature sensor 79 and cooling water outlet temperature sensor 70.

First Embodiment

Figure 1:
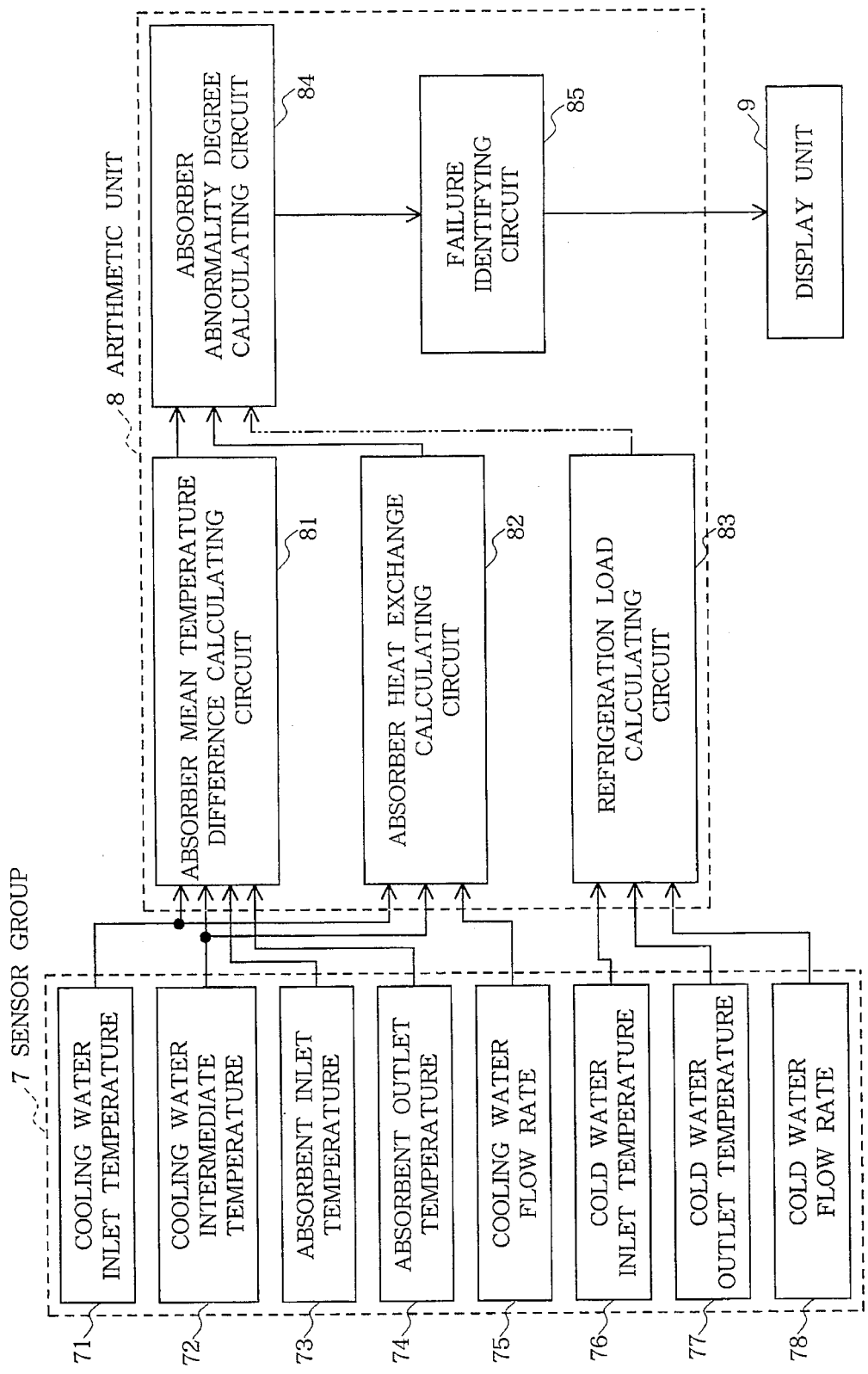
FIG. 1 is a block diagram of a first embodiment of the invention to show an arrangement for an absorber.

FIG. 1 shows the construction of a failure diagnosing system as this embodiment. The sensor group 7 affords various items of measurement data, which are fed to an arithmetic unit 8 comprising a microcomputer for identifying a failure as will be described below. The result obtained is output to a display unit 9 comprising a display, printer, alarm lamp or the like.

The arithmetic unit 8 comprises calculating circuits 81, 82, 83, 84 and failure identifying circuit 85 to be described below and each comprising a computer program.

More specifically, an absorber mean temperature difference calculating circuit 81 uses Mathematical Expression 2 given below for calculating the mean temperature difference Tm of the absorber 22 from the cooling water inlet temperature Tco_in obtained by the sensor 71, cooling water intermediate temperature Tco_mid obtained by the sensor 72, absorbent (concentrate) inlet temperature Ta_in obtained by the sensor 73 and absorbent (dilution) outlet temperature Ta_out obtained by the sensor 74.

Mathematical Expression 2:

$$Tm=\{(Ta\_in+Ta\_out)-(Tco\_in+Tco\_mid)\}/2$$

The mean temperature difference Tm given by Expression 2 represents the difference between the mean temperature of the absorbent flowing through the absorber 22 and the mean temperature of the cooling water therethrough, and is a valve approximate to the logarithmic mean temperature difference of the absorber 22.

The mean temperature difference Tm of the absorber 22 is not limited to the one obtained from the above linear expression, i.e., Expression 2, but can be values defined by various linear expressions, i.e., Mathematical Expressions 3 given below.

Mathematical Expressions 3:

$$Tm = Ta\_in - (Tco\_in + Tco\_mid)/2$$
$$Tm = Ta\_out - (Tco\_in + Tco\_mid)/2$$
$$Tm = (Ta\_in + Ta\_out)/2 - Tco\_in$$
$$Tm = (Ta\_in + Ta\_out)/2 - Tco\_mid$$
$$Tm = Ta\_out - Tco\_in$$
$$Tm = Ta\_in - Tco\_in$$
$$Tm = Ta\_out - Tco\_mid$$
$$Tm = Ta\_in - Tco\_mid$$

An absorber heat exchange calculating circuit 82 uses Mathematical Expression 4 for calculating the amount of heat exchange Cabbies of the absorber 22 from the cooling water inlet temperature Tco_in obtained by the sensor 71, cooling water intermediate temperature Tco_mid obtained by the sensor 72 and cooling water flow rate Vc obtained by a cooling water flow rate sensor 75.

Mathematical Expression 4:

$$Cabbies=Vc\times(Tco\_mid-Tco\_in)$$

A refrigeration load calculating circuit 83 uses Mathematical Expression 5 for calculating the amount of heat exchange by the evaporator 21, namely, refrigeration load L, from the cold water inlet temperature T_in obtained by the sensor 76, cold water outlet temperature T_out obtained by the sensor 77 and cold water flow rate Vc obtained by a cold water flow rate sensor 78.

Mathematical Expression 5:

$$L=Vc\times(T\_in-T\_out)$$

Further an absorber abnormality degree calculating circuit 84 calculates according to Mathematical Expression 6 the abnormality degree Arabs of the absorber 22 from the absorber mean temperature difference Tm obtained by the circuit 81 and the amount of heat exchange Cabbies of the absorber 22 obtained by the circuit 82.

Mathematical Expression 6:

$$Arabs=(Tm-Tan)/Tan$$

wherein Tan is an ideal mean temperature difference during normal operation. Such difference values are prepared in advance as related to the amount of heat exchange Cabbies by the absorber in the form of a graph or table and stored in a memory.

Figure 2:
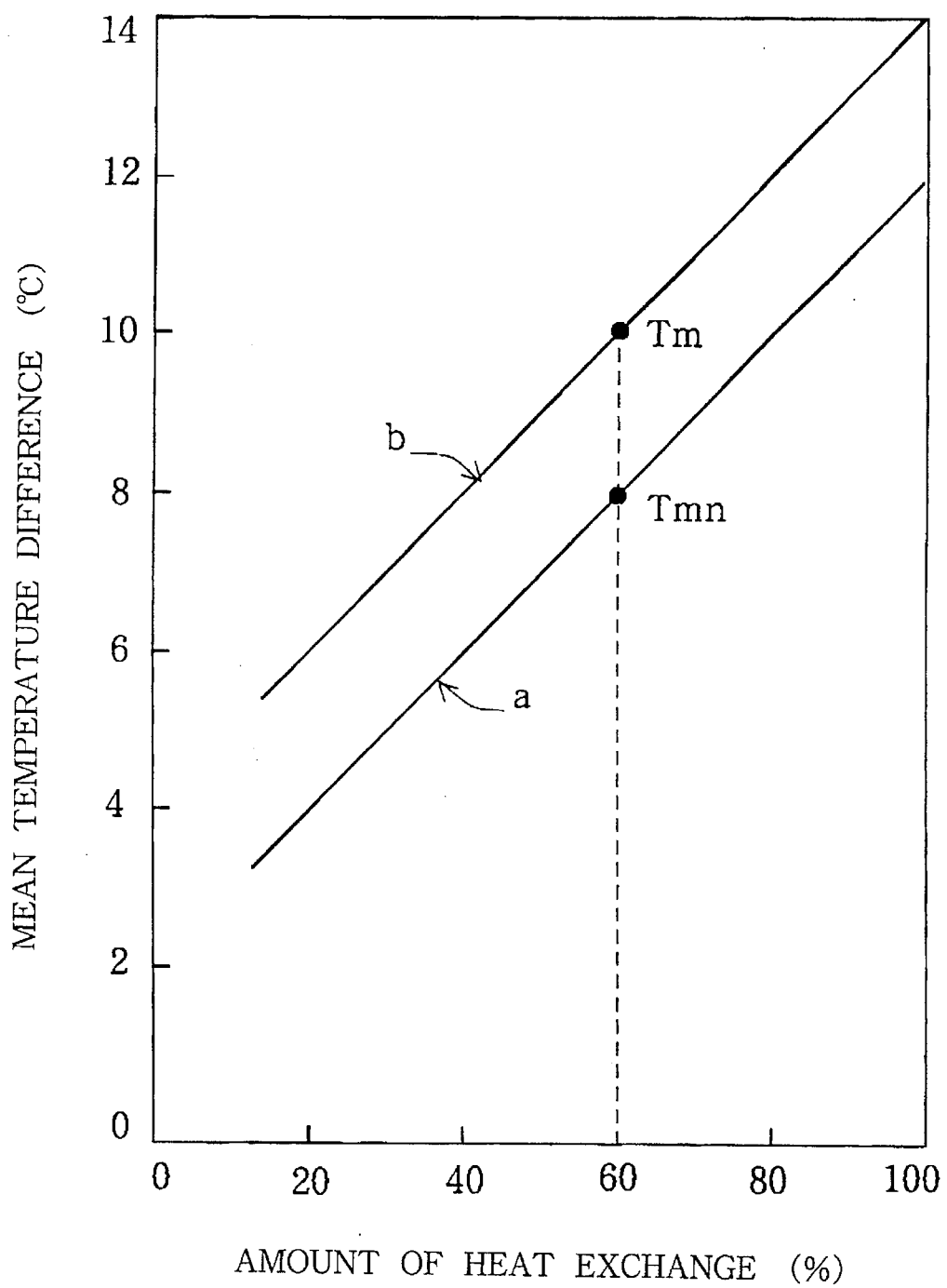
FIG. 2 is a graph showing variations in mean temperature difference vs. the amount of heat exchange.

FIG. 2 is a graph wherein the amount of heat exchange by the absorber is plotted as abscissa vs. the mean temperature difference as ordinate to show the variation a of the ideal mean temperature difference and the variation b of the mean temperature difference Tm obtained by actual measurement.

The abnormality degree Arabs defined by Expression 6 is a value which is obtained by normalizing with an ideal mean temperature difference Tan the difference between the actual mean temperature difference Tm and the ideal mean temperature difference Tan for an optional amount of heat exchange shown in FIG. 2. Regardless of whether the amount of heat exchange is great or small, this value serves as a universal index indicating the degree of abnormality of the absorber.

The amount of heat exchange providing a basis for calculating the abnormality degree of the absorber 22 is not limited only to the amount of heat exchange by the absorber 22 but can be the amount of heat exchange by the evaporator 21 which is in a proportional relation thereto, i.e., the refrigeration load.

In this case, the refrigeration load L obtained from the refrigeration load calculating circuit 83 shown in FIG. 1 is fed to the absorber abnormality degree calculating circuit 84 and used for the calculation of abnormality degree. The failure identifying circuit 85 checks the absorber abnormality degree determined by the circuit 84 according to predetermined criteria to identify the degree of failure and feeds the result to the display unit 9.

In the case where the temperature difference defined by the linear expression included in Mathematical Expressions 2 and 3 is used, the failure diagnosing system detects an abnormality of the absorber for the identification of failure by a simple calculation procedure without necessitating any logarithmic calculation as reliably as the conventional method of abnormality detection with use of the logarithmic mean temperature difference.

When the failure identifying method of the invention based on a temperature difference afforded by the simple mathematical expression is compared with the conventional method based on a logarithmic mean temperature difference, both methods identify a failure according to a ratio (abnormality degree) relative to the temperature difference of normal operation instead of using the absolute value of the temperature difference, so that logarithmic calculation has little or no significance if conducted, and the two methods are comparable.

The simple mathematical expression used in the present invention eliminates the need for logarithmic calculation and therefore permits use of a circuit of smaller scale than conventionally, ensuring an advantage in mounting the circuit board on the control panel of the chiller.

Further in the case where the temperature difference defined by Expression 3 is used, the four temperature measuring points conventionally needed can be reduced to three or two points. This decreases the number of temperature sensors to be provided on the absorption chiller to result in a simplified construction.

Figure 3:
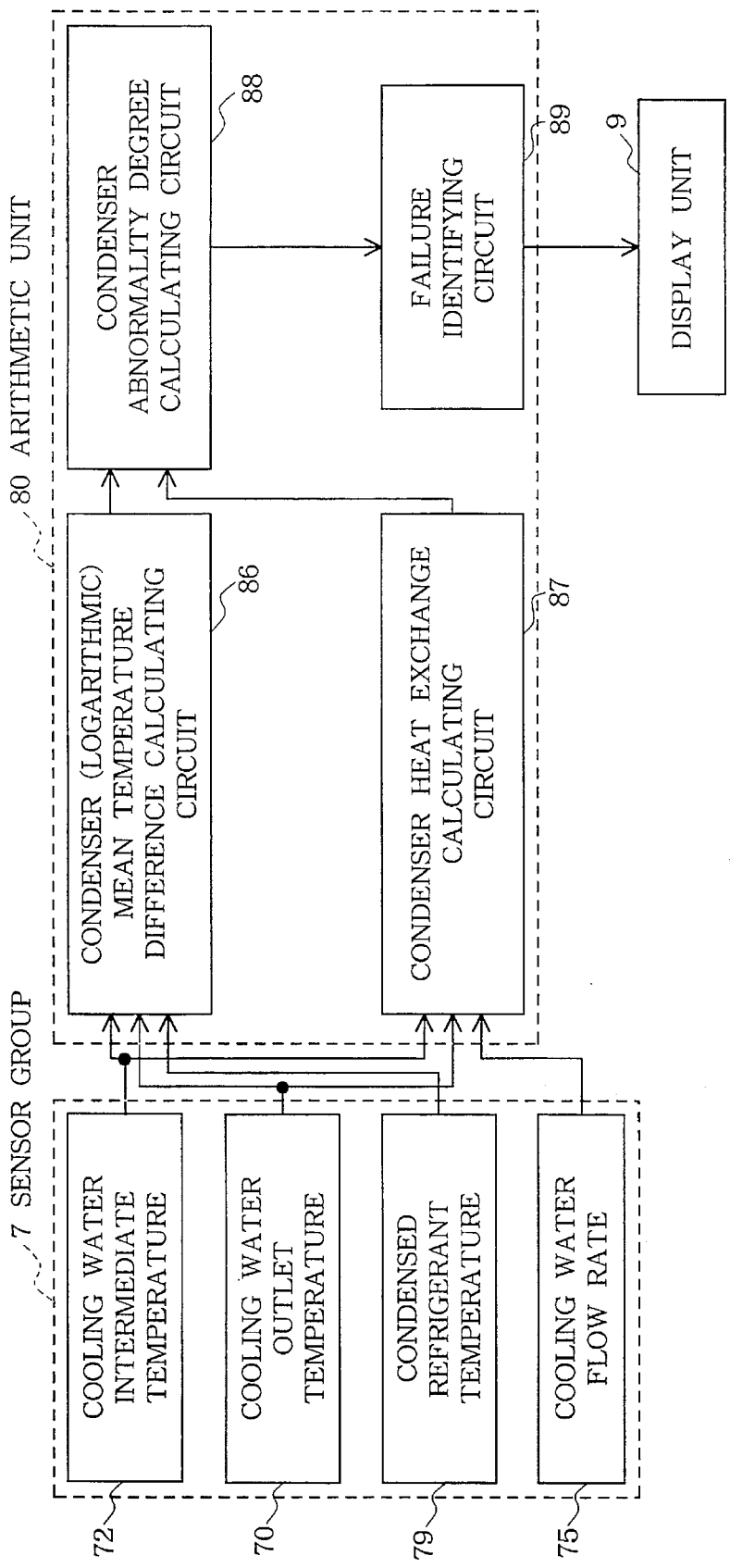
FIG. 3 is a block diagram of the first embodiment to show an arrangement for a condenser.

FIG. 3 shows the construction of the failure diagnosing system for the condenser 11. As in the foregoing arrangement, the sensor group 7 feeds measurement data to an arithmetic unit 80, which identifies a failure based on an abnormality of the condenser 11 detected. The result is presented on the display unit 9.

The arithmetic unit 80 comprises a circuit 86 for calculating the mean temperature difference of the condenser, a circuit 87 for calculating the amount of heat exchange by the condenser, a circuit 88 for calculating the degree of abnormality of the condenser and a failure identifying circuit 89. According to Mathematical Expression 7 given below, the circuit 86 calculates the mean temperature difference Tm' of the condenser from the cooling water intermediate temperature Tco_mid obtained by the sensor 72, cooling water outlet temperature Tco_out obtained by the sensor 70 and condensed refrigerant temperature Tv_cod obtained by the sensor 79.

Mathematical Expression 7:

$$Tm'=\{(Tv\_cod-Tco\_mid)+(Tv\_cod-Tco\_out)\}/2$$

The mean temperature difference of the condenser can be a value calculated from a simpler expression defined by measurement data at two points.

The condenser heat exchange calculating circuit 87 uses Mathematical Expression 8 given below to calculate the amount of heat exchange Qcond by the condenser from the cooling water intermediate temperature Tco_mid obtained by the sensor 72, cooling water outlet temperature Tco_out obtained by the sensor 70 and cooling water flow rate Vc obtained by the sensor 75.

Mathematical Expression 8:

$$Qcond=Vc\times(Tco\_out-Tco\_mid)$$

The condenser abnormality degree calculating circuit 88 uses Mathematical Expression 9 given below to calculate the abnormality degree Acond of the condenser 11 from the actual condenser mean temperature difference Tm' obtained by the calculating circuit 86 and the amount of condenser heat exchange Qcond obtained by the circuit 87.

Mathematical Expression 9:

$$Acond=(Tm'-Tan')/Tan'$$

wherein Tan' is an ideal mean temperature difference during normal operation. Such difference values as related to the amount of condenser heat exchange Qcond are defined by a mathematical expression or prepared in the form of a table in advance and stored in a memory.

The condenser abnormality degree obtained from the circuit 88 is fed to the failure identifying circuit 89 and compared with predetermined criteria. The circuit 89 identifies the degree of failure based on the result of comparison and feeds the result to the display unit 9.

The condenser failure diagnosing system shown in FIG. 3 is not only adapted to properly detect an abnormality in the condenser even while the chiller is partly loaded for early inspection and maintenance but also has the same advantage in circuit construction as the absorber failure diagnosing system shown in FIG. 1.

With the foregoing embodiment, the flow rate of the cooling water or cold water is measured in calculating the amount of heat exchange by the condenser 11, and the absorber 22 or evaporator 21, but when the flow rate of the water is constant, the amount of heat exchange can be calculated based only on measurement data as to the inlet and outlet temperatures of the cooling water or cold water.

Second Embodiment

Figure 4:
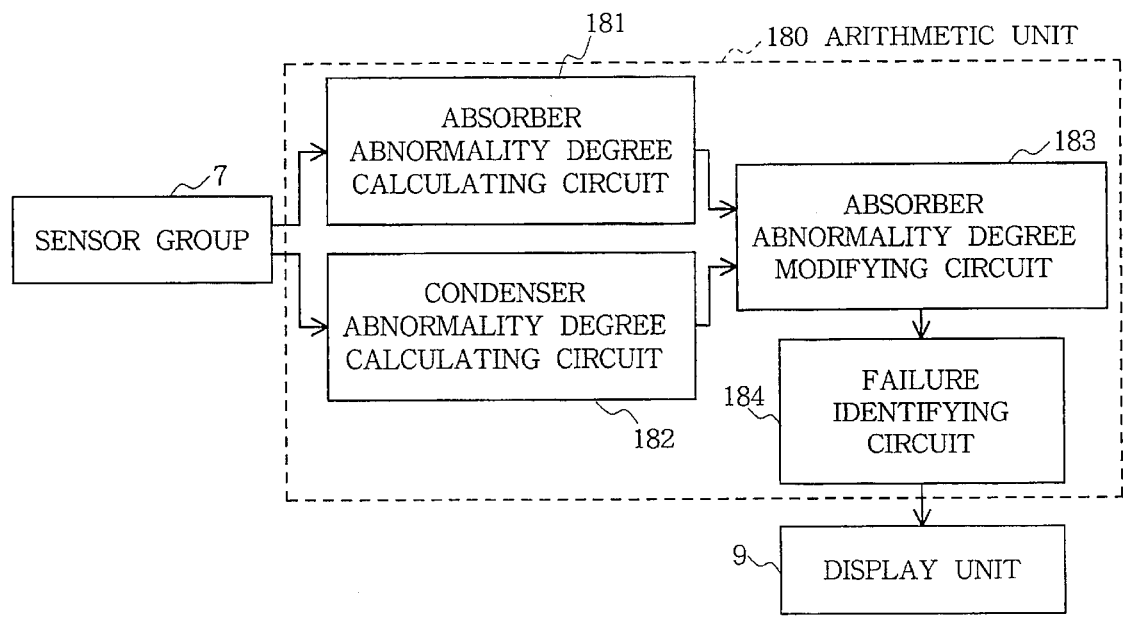
FIG. 4 is a block diagram showing the construction of a second embodiment.

FIG. 4 shows an arithmetic unit 180 which comprises a circuit 181 for calculating the degree of abnormality of the absorber from measurement data from the sensor group 7, and a circuit 182 for calculating the degree of abnormality of the condenser from like data.

The logarithmic mean temperature difference Δ Tabs of the absorber 22 is given by Mathematical Expression 10, and the logarithmic mean temperature difference ΔTcond of the condenser 11 by Mathematical Expression 11.

Mathematical Expression 10:

$$\Delta Tabs=\{(Ts\_lo-Tco\_mid)-(Tw\_lo-Tco\_in)\}/ln\{(Ts\_lo-Tco\_mid)/(Tw\_lo-Tco\_in)\}$$

Mathematical Expression 11:

$$\Delta Tcond=\{(Tv\_cod-Tco\_out)-(Tv\_cod-Tco\_mid)\}/ln\{(Tv\_cod-Tco\_out)/(Tv\_cod-Tco\_mid)\}$$

wherein

Ts_lo: absorber inlet temperature of the absorbent (concentrate)

Tv_cod: condenser outlet temperature of the refrigerant

Tw_lo: absorber outlet temperature of the absorbent (dilution)

Tco_in: cooling water inlet temperature

Tco_mid: cooling water intermediate temperature

Tco_out: cooling water outlet temperature

The abnormality degree Arabs of the absorber 22 and the abnormality degree A cod of the condenser 11 are calculated from the logarithmic mean temperature differences Tabs and Tcond thus obtained. The normal value of logarithmic mean temperature difference of each of the absorber 22 and the condenser 11 is made a function or tabular in advance with the refrigeration load serving as a variable.

The arithmetic unit 180 further has a circuit 183 for modifying the absorber abnormality degree based on the calculated absorber abnormality degree and condenser abnormality degree. According to Mathematical Expression 12 given below, the circuit 183 calculates a modified value xAabs of absorber abnormality degree free from the influence of foulness of the cooling water.

Mathematical Expression 12:

$$xAabs=Arabs-K\cdot Acond$$

wherein K is a coefficient which is experimentally determined and is usually about 1.2.

For example, an abnormal vacuum, if occuring in the lower shell 2, will not be propagated to the upper shell 1, rendering the condenser 11 free of the influence of the abnormal vacuum. Further if the absorbent becomes mixed with the vapor in the high temperature generator 3, contaminating the refrigerant, the contaminated vapor passes through the condenser 11 and therefore temporarily varies the logarithmic mean temperature difference of the condenser 11 to result in an altered condenser abnormality degree. However, the absorbent passing through the condenser 11 moves into the evaporator 21 of the lower shell 2 immediately thereafter and subsequently merely circulates through the refrigerant recycling channel without returning to the condenser 11 again. Accordingly, the condenser abnormality degree can be said to be free from the influence of the contamination of the refrigerant when the abnormality for a length of time is considered. Thus, Expression 12 gives an absorber abnormality degree from which the influence of foulness of the cooling water has been excluded and which nevertheless involves the influence of other abnormality as it is.

Figure 5:
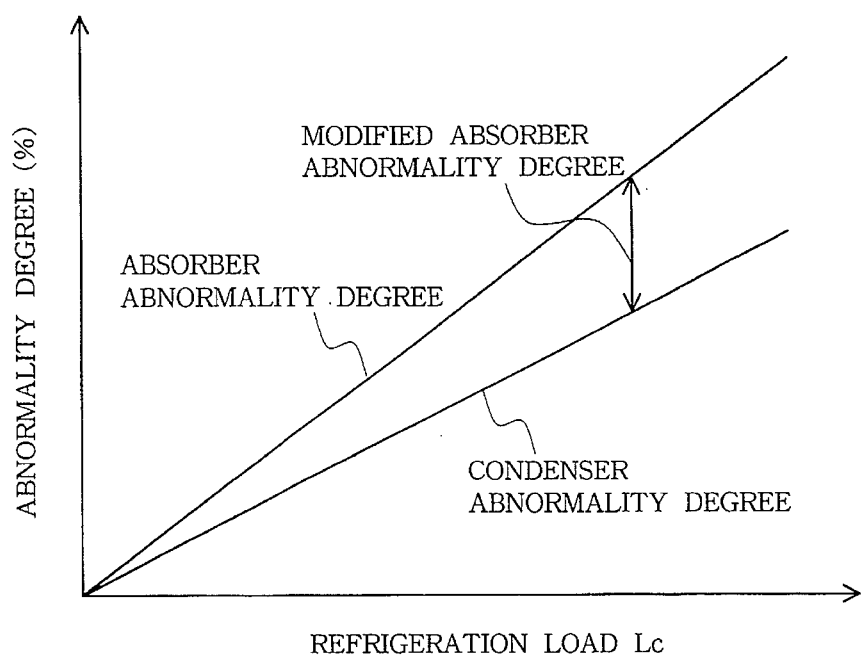
FIG. 5 is a graph showing variations in modified absorber abnormality degree.

FIG. 5 shows the abnormalities of the absorber 22 and the condenser 11 which increase with an increase in refrigerant load, the difference between the increasing abnormalities representing the modified absorber abnormality degree.

The modified absorber abnormality degree xAabs thus obtained is fed to the failure identifying circuit 184 shown in FIG. 4. The circuit detects an abnormal vacuum, contamination of the refrigerant or like abnormality while taking into consideration the abnormality degree of, or measurement data as to, other heat exchange unit when required, whereby a failure of particular portion of the chiller is identified.

Even if the foulness of the cooling water increases with time, abnormalities, such as abnormal vacuum and contamination of the refrigerant, which are truly objectionable can be detected by the foregoing failure diagnosing system with the influence of the foul cooling water excluded, whereby failures are identified with high reliability.

Third Embodiment

This embodiment is adapted to accurately detect abnormal concentrations of the absorbent from measurements obtained by thermometers without using pressure sensors.

The embodiment applies two measurement principles to the detection of the temperature of saturated vapor in the condenser 11. The first of the priciples is that the saturated vapor temperature is approximately equal to the refrigerant condensation temperature. The second principle is that the difference between the saturated vapor temperature and the refrigerant condensation temperature varies with the cooling water temperature. More specifically, although the saturated vapor temperature is approximately equal to the refrigerant condensation temperature, a difference occurs between these temperatures, for example, owing to a flow of vapor produced in the high temperature generator 3 into the condenser 11 upon condensation.

With the absorption chiller, the operating condition differs greatly with variations in the cooling water temperature, and it is thought that temperature variations or pressure variations of portions of the chiller can be approximated with a function including the cooling water temperature as a variable.

Accordingly, the difference between the saturated vapor temperature and the refrigerant condensation temperature is similarly defined in advance as a function of the cooling water temperature to derive the temperature difference from a measured value of cooling water temperature and correct the refrigerant condensation temperature with the temperature difference.

Figure 6:
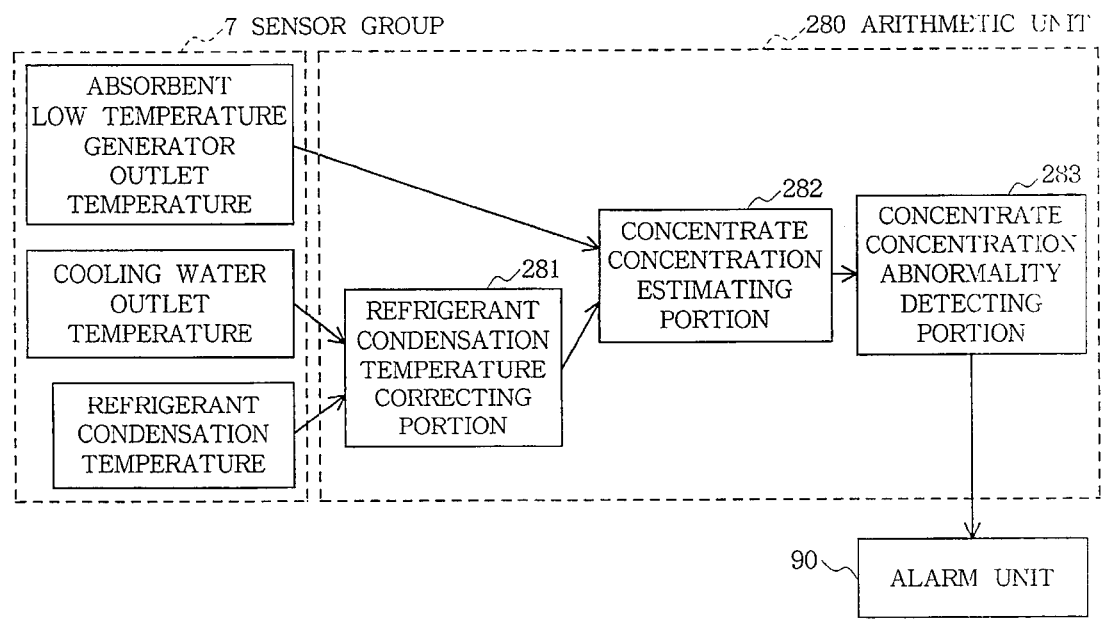
FIG. 6 is a diagram showing the construction of a third embodiment.
Figure 7:
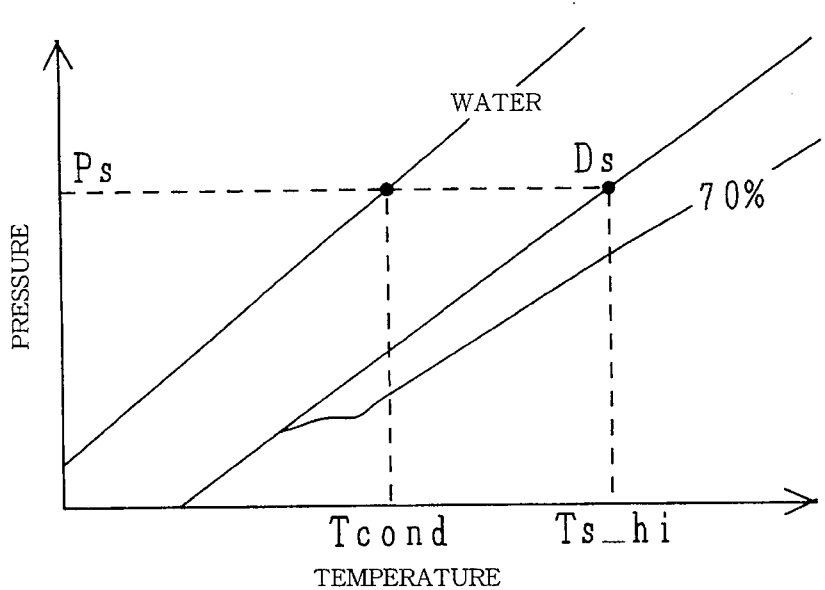
FIG. 7 is a graph showing part of a Dühring diagram.

In the present embodiment which is shown in FIG. 6, the sensor group 7 mounted on the main chiller assembly measures the temperature $Ts\_hi$ of the abosrbent at the outlet of the low temperature generator 12, the temperature $Tco\_out$ of the cooling water at the outlet of the condenser 11 and the refrigerant condensation temperature $Tv\_cod$ in the condenser 11, and the measurement data is fed to an arithmetic unit 280.

The arithmetic unit 280 includes a refrigerant condensation temperature correcting portion 281 for correcting the measurement of refrigerant condensation temperature $Tv\_cod$ based on the measurement of cooling water outlet temperature $Tco\_out$. Registered in the correcting portion 281 is a procedure for deriving a corrected value $mTv\_cod$ of refrigerant condensation temperature by adding to the temperature $Tv\_cod$ a refrigerant condensation temperature correction $g(Tco\_out)$ including the cooling water outlet temperature $Tco\_out$ as a variable as represented by Mathematical Expression 13.

Mathematical Expression 13:

$$mTv\_cod = Tv\_cod + g(Tco\_out)$$

The correction $g(Tco\_out)$ is predetermined experimentally.

Figure 10:
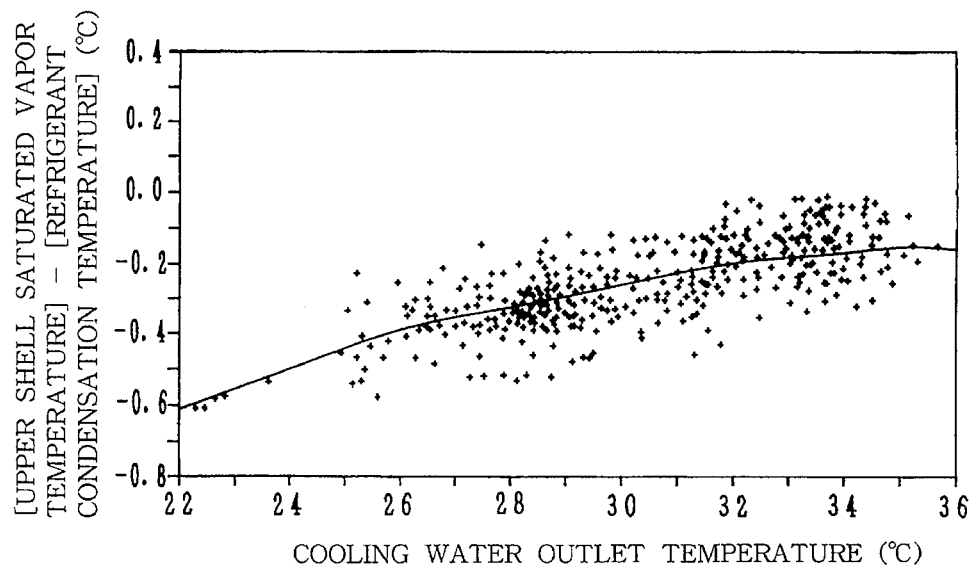
FIG. 10 is a graph showing like variations at varying cooling water outlet temperatures.

More specifically, with the absorption chiller in normal operation, the difference between the upper shell saturated vapor temperature is measured while varying the condensation temperature is measured while varying the cooling water outlet temperature as shown in FIG. 10. The measurements obtained are subjected to regression analysis to obtain a function of the difference between the upper shell saturated vapor temperature and the refrigerant condensation temperature using the cooling water outlet temperature as a variable. For example, FIG. 10 affords Mathematical Expression 14 given below.

Mathematical Expression 14:

$$g(Tco\_out) = -2.98 + 0.154 \cdot Tco\_out - 2.12 \times 10^{-3} \cdot Tco\_out^2$$

Incidentally, the refrigerant condensation temperature correction can be defined also as a function $g(Tco\_in)$ of the cooling water inlet temperature or as a function $g(Tco\_mid)$ of the cooling water intermediate temperature.

In this case, Mathematical Expression 15 or 16 for correction is registered in the correcting portion 281.

Mathematical Expression 15:

$$mTv\_cod = Tv\_cod + g(Tco\_in)$$

Mathematical Expression 16:

$$mTv\_cod = Tv\_cod + g(Tco\_mid)$$

Figure 8:
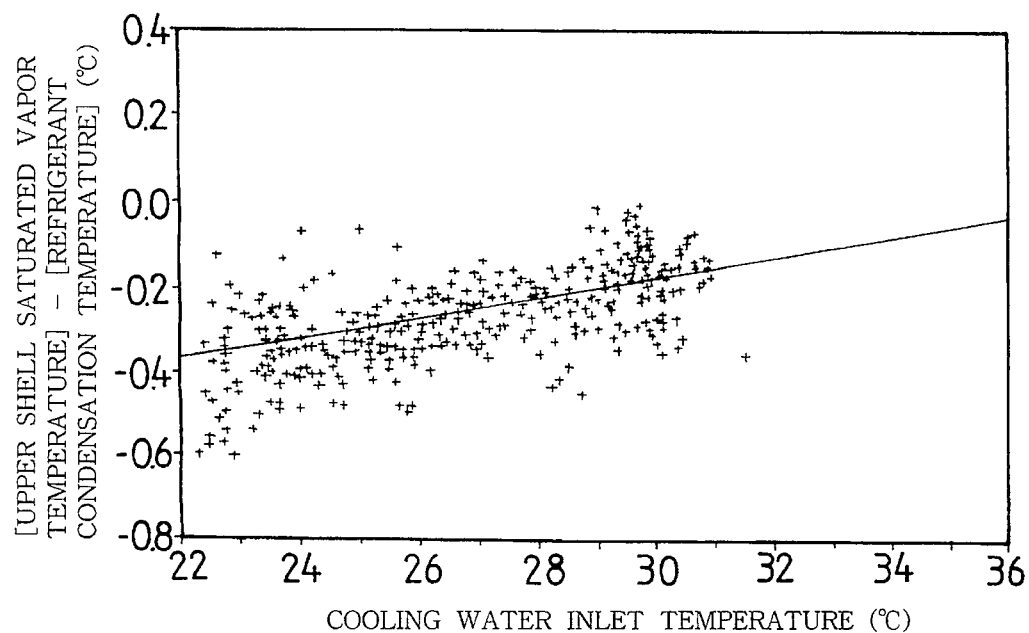
FIG. 8 is a graph showing variations in the difference between saturated vapor temperature and refrigerant condensation temperature at varying cooling water inlet temperatures.
Figure 9:
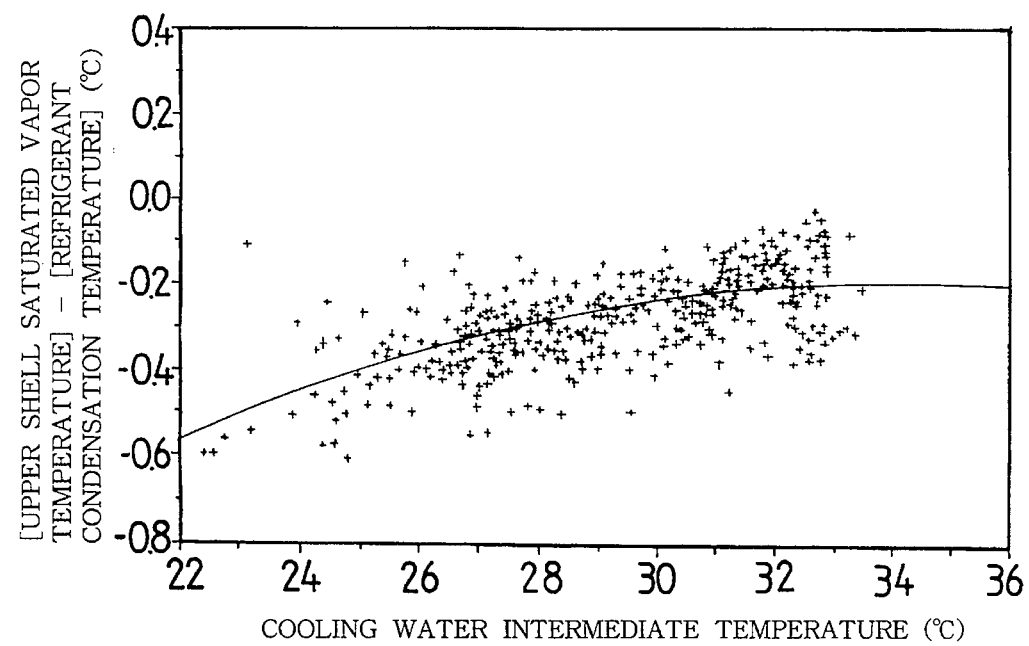
FIG. 9 is a graph showing like variations at varying cooling water intermediate temperatures.

The refrigerant condensation temperature correction $g(Tco\_in)$ or $g(Tco\_mid)$ is predetermined experimentally. With the absorption chiller in normal operation, the difference between the upper shell saturated vapor temperature and the refrigerant condensation temperature is measured at varying cooling water inlet temperatures as shown in FIG. 8 or at varying cooling water intermediate temperatures as seen in FIG. 9. The measurements obtained are subjected to regression analysis to obtain a function of the difference between the two temperatures. For example, FIG. 8 gives Mathematical Expression 17.

Mathematical Expression 17:

$$g(Tco\_in) = -0.752 + 1.35 \times 10^{-2} \cdot Tco\_in + 1.77 \times 10^{-4} \cdot Tco\_in^2$$

FIG. 9 affords Mathematical Expression 18.

Mathematical Expression 18:

$$g(Tco\_mid) = -3.16 + 0.173 \cdot Tco\_mid - 2.52 \times 10^{-3} Tco\_mid^2$$

The refrigerant condensation temperature $mTv\_cod$ corrected by the correcting portion 281 of FIG. 6 is fed to a concentrate concentration estimating portion 282, which calculates the concentration Ds of concentrate from the temperature $mTv\_cod$ and the absorbent low temperature generator outlet temperature $Ts\_hi$ obtained from the sensor group 7 according to Mathematical Expression 19.

Mathematical Expression 19:

$$Ds = (Ts\_hi + 280.0) \times 139.0/(mTv\_cod + 273.0) - 102.4$$

The concentrate concentration Ds calculated by the estimating portion 282 is sent to a concentrate concentration abnormality detecting portion 283, which prepares diagnosis data indicating a degree of abnormality, for example, according to Mathematical Expression 20. The data is further output to a display, alarm or like alarm unit 90. If the diagnosis data indicates an abnormality, a safety device operates to discontinue the operation of the absorption chiller.

Mathematical Expression 20:

If $Ds > 65\%$, then the diagnosis data=abnormality.

If $64.5\% < Ds < 65\%$, then the diagnosis data=caution.

If $Ds < 64.5\%$, then the diagnosis data=normality.

The abnormality identifying system described is adapted to accurately estimate the concentration of the concentrate based on the measurements of thermometers only, consequently identifying an abnormality properly.

Fourth Embodiment

With the foregoing third embodiment, the estimated value of concentrate concentration is compared with a given reference value for the identification of abnormality, while the present embodiment is adapted to identify an abnormality more accurately with reference to a normal value of concentrate concentration.

Figure 12:
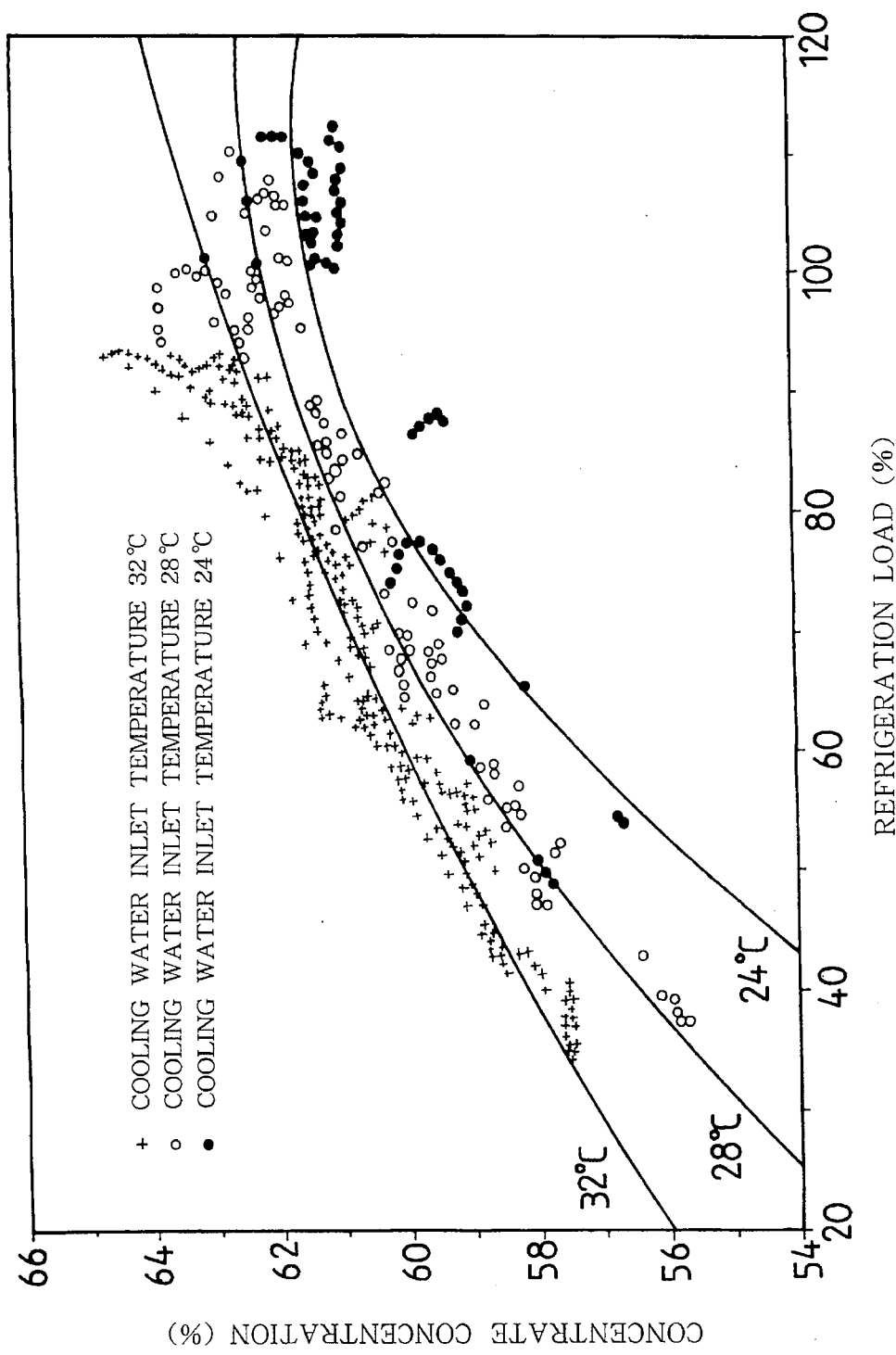
FIG. 12 is a graph showing the relationship between the refrigeration load and the concentrate concentration with cooling water inlet temperatures used as a parameter.

In absorption chillers, the operating state of its components alters with the cooling water temperature, and quantities of many states, such as temperatures and pressures, can be approximated as a function of cooling water temperature. Accordingly, when the concentrate concentration is measured while varying the refrigeration load with the cooling water temperature held at a constant level as shown in FIG. 12, a definite relationship is obtained along a quadratic curve as indicated in a solid line. Further as the cooling water inlet temperature lowers, the relationship between the refrigeration load and the concentrate concentration represented by the quadratic curve shifts toward lower concentrations. Accordingly, if the relationship between the refrigeration load and the concentrate concentration in normal operating state is expressed as a function in advance with the cooling water inlet temperature used as a parameter, a normal value of concentrate concentration can be calculated based on measured values of cooling water inlet temperature and refrigeration load.

Figure 11:
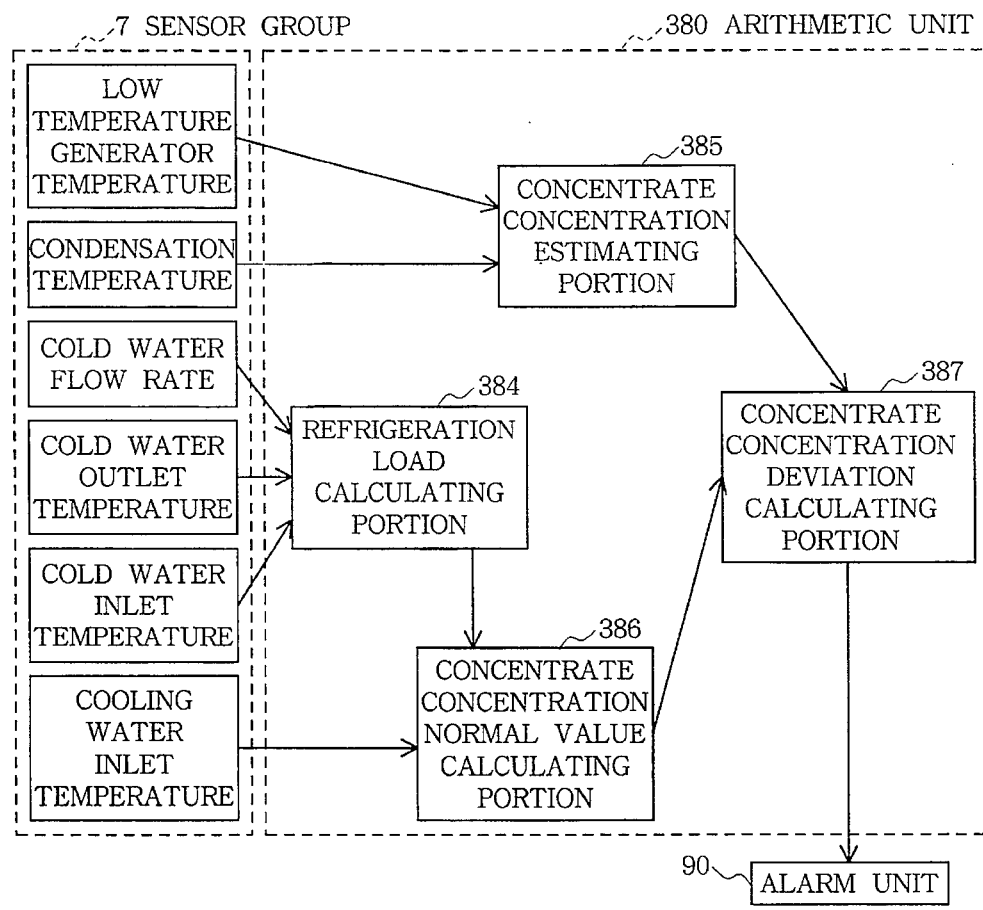
FIG. 11 is a block diagram showing the construction of a fourth embodiment.

In the case of the present embodiment as illustrated in FIG. 11, the sensor group 7 on the main chiller assembly measures the absorbent temperature $Ts\_hi$ at the outlet of the low temperature generator 12, refrigerant condensation temperature $Tv\_cod$ in the condenser 11, cold water flow rate Vc, cold water outlet temperature $T\_out$, cold water inlet temperature $T\_in$ and cooling water inlet temperature $Tco\_in$. These items of measurement data are sent to an arithmetic unit 380, which includes a refrigeration load calculating portion 384 for calculating the refrigeration load L from the cold water flow rate Vc, cold water outlet temperature $T\_out$ and cold water inlet temperature $T\_in$ according to Mathematical Expression 21.

Mathematical Expression 21:

$$L = Vc \times (T\_in - T\_out)$$

The arithmetic unit 380 further has a concentrate concentration estimating portion 385 for calculating the concentrate concentration Ds from the absorbent low temperature generator outlet temperature $Ts\_hi$ and refrigerant condensation temperature $Tv\_cod$ using Mathematical Expression 22.

Mathematical Expression 22:

$$Ds = (Ts\_hi + 280.0) \times 139.0/(Tv\_cod + 273.0) - 102.4$$

The refrigeration load L obtained from the calculating portion 384 and the cooling water inlet temperature $Tco\_in$ obtained from the sensor group 7 are fed to a concentrate concentration normal value calculating portion 386, which calculates a normal value $Ds\_n$ of concentrate concentration.

The calculating portion 386 has stored therein concentration curves representing variations in concentrate concentration normal value, shown in solid lines in FIG. 12 and as converted to the form of a function for different cooling water inlet temperatures as a parameter. Mathematical Expression 23 given below is a quadratic expression approximating the concentrate concentration curve at a specified cooling water inlet temperature.

Mathematical Expression 23:

$$Ds\_n = a \times L^2 + b \times L + c$$

wherein a, b and c are constants determined by applying least squares to measurements shown in the graph of FIG. 12.

The normal value calculating portion 386 has further stored therein a procedure for executing interpolation for an optional cooling water inlet temperature $Tco\_in$ which is not included in the parameter, whereby the normal value of concentrate concentration is calculated with high accuracy in corresponding relation to the measurements of refrigeration load and cooling water inlet temperature.

The assessed value $Ds\_m$ of concentrate concentration calculated by the estimating portion 385 and the normal value $Ds\_n$ of concentrate concentration calculated by the calculating portion 386 are fed to a concentrate concentration deviation calculating portion 387, which calculates the concentration difference dDs between the two values according to Mathematical Expression 24.

Mathematical Expression 24:

$$dDs = Ds\_m - Ds\_n$$

The calculated concentration difference dDs is sent to an alarm unit 9, which prepares the following diagnosis data in accordance with the difference dDs to notify the monitor of the data.

$dDs < t1$: normal $dDs > t1$: caution against crystallization wherein t1 is a predetermined constant.

The embodiment described above properly detects abnormal concentrate concentrations in the absorption chiller regardless of the refrigeration load or cooling water temperature. Especially because the system offers caution against crystallization of the absorbent even when the load is low or the cooling water temperature is low, the cause for the abnormality can be obviated by inspecting the chiller at a suitable time in preparation for a high-load operation during summer.

In formulating the data shown in FIGS. 8 to 10 and FIG. 12 into functions, not only quadratic curves but also desired regression curves are usable.

Fifth Embodiment

Figure 13:
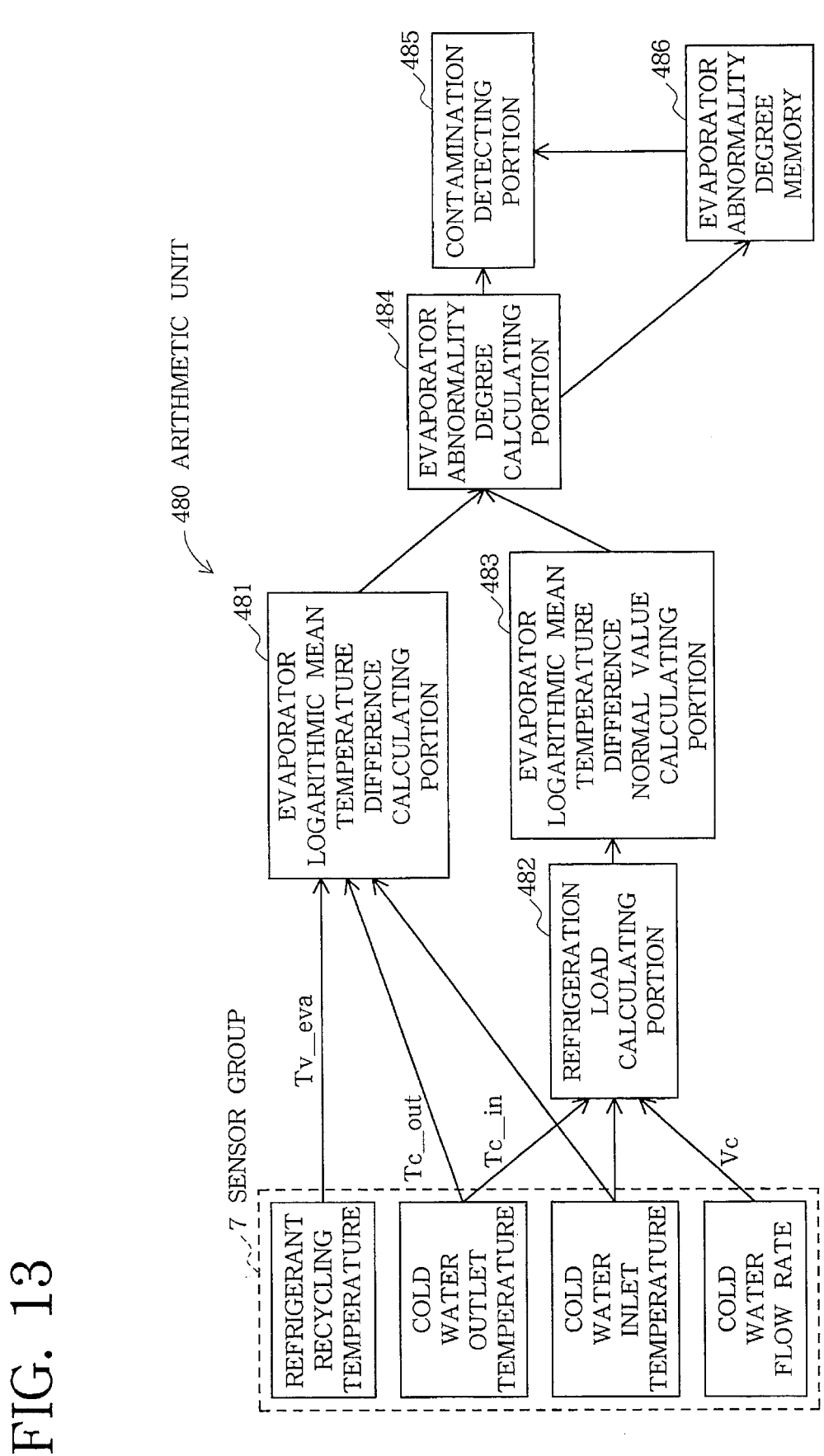
FIG. 13 is a block diagram showing the construction of a fifth embodiment.

As shown in FIG. 13, the sensor group 7 includes thermometers and flow meter for measuring the recycling temperature $Tv\_eva$ of the refrigerant recycling through the evaporator 21, cold water temperatures $T\_out$ and $T\_in$ at the outlet and inlet of the evaporator and cold water flow rate.

An arithmetic unit 480 comprises, in addition to four calculating portions 481 to 484, a detecting portion 485 and memory 486. More specifically, an evaporator logarithmic mean temperature difference calculating portion 481 uses Mathematical Expression 25 for calculating the logarithmic mean temperature difference dTeva from the refrigerant recycling temperature $Tv\_eva$, cold water outlet temperature T_out and cold water inlet temperature T_in obtained by the sensor group 7.

Mathematical Expression 25:

$$dTeva=\{(T\_in-Tv\_eva)-(T\_out-Tv\_eva)\}/\log\{(T\_in-Tv\_eva)/(T\_out-Tv\_eva)\}$$

A refrigeration load calculating portion 482 calculates the refrigeration load L from the cold water outlet temperature T_out, cold water inlet temperature T_in and cold water flow rate Vc obtained by the sensor group 7 using Mathematical Expression 26.

Mathematical Expression 26:

$$L=Vc\times(T\_in-T\_out)$$

An evaporator logarithmic mean temperature difference normal value calculating portion 483 substitutes the refrigeration load L obtained from the calculating portion 482 in Mathematical Expression 27 to calculate the normal value dTeva_n of evaporator logarithmic mean temperature difference under the current operating condition.

Mathematical Expression 27:

$$dTeva\_n=g(L)$$

wherein g is an experimentally predetermined function, for example, a linear expression.

An evaporator abnormality degree calculating portion 484 calculates the abnormality degree Aeva of the evaporator from the logarithmic mean temperature difference dTeva obtained by the calculating portion 481 and the normal value dTeva_n obtained by the calculating portion 483, using Mathematical Expression 28.

Mathematical Expression 28:

$$Aeva=(dTeva-dTeva\_n)/dTeva\_n$$

The abnormality degree obtained from the calculating portion 484 is stored in an evaporator abnormality degree memory 486. The memory 486 has a capacity to store history data as to the abnormality degrees obtained during a specified period of time (e.g., several minutes to several hours), such that when new data is input, the old data is erased to always store the abnormality degrees during the latest specified period.

A contamination detecting portion 485 reads the history data of abnormality degrees during the past specified period from the memory 486 and checks whether the tendency for the abnormality degree to vary with time changes to a different tendency at a certain time. Such a change, if occurring, is interpreted as indicating that the refrigerant became contaiminated with the absorbent at the time of the change. The result is delivered from a printer, display or like output unit (not shown).

Figure 14:
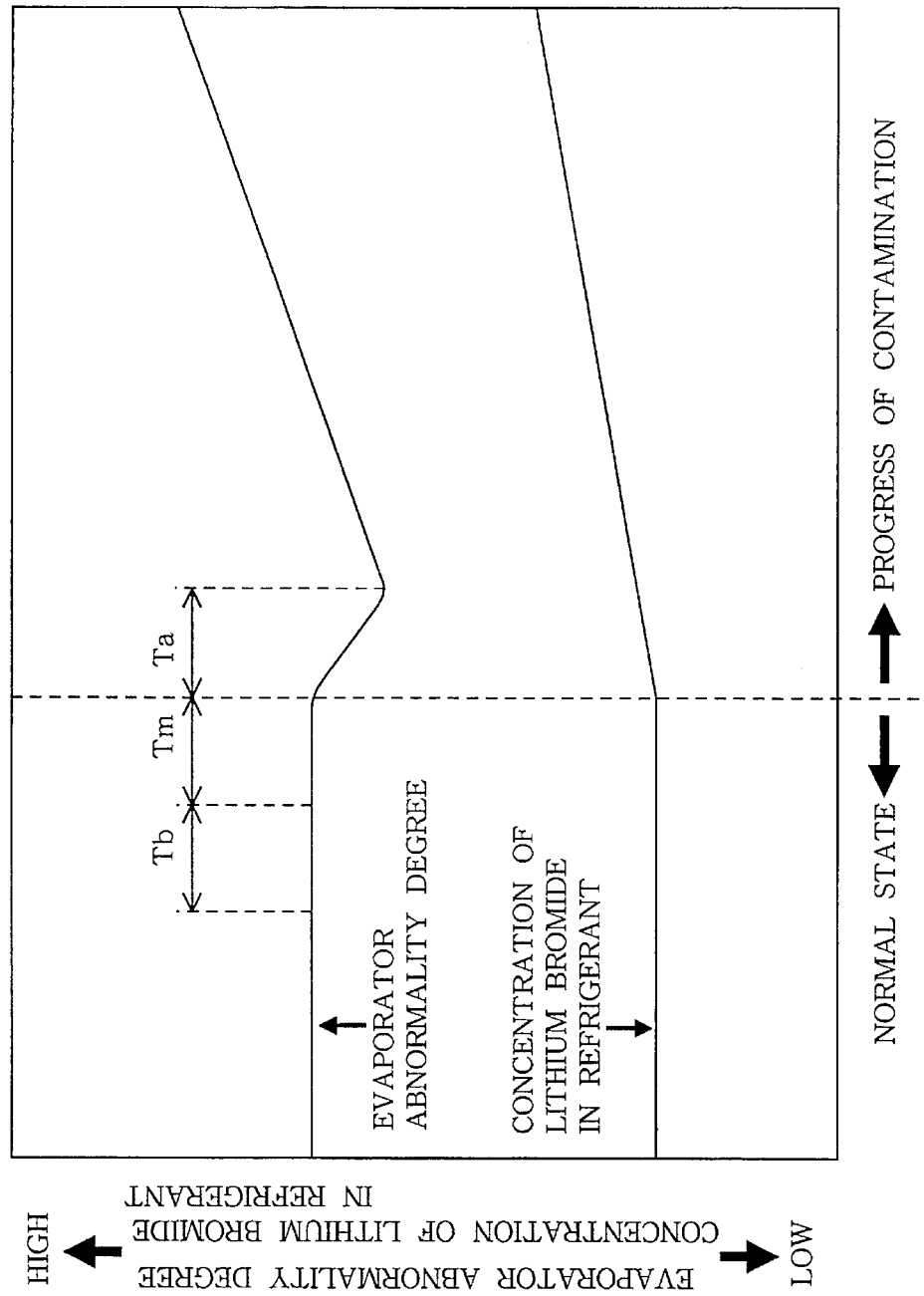
FIG. 14 is a graph showing the relationship between the increase in the concentration of lithium bromide in the refrigerant and the evaporator abnormality degree.

While the absorption chiller was in actual operation, lithium bromide was admixed with the refrigerant to a gradually increasing concentration, and the evaporator was checked for variations in the degree of abnormality. FIG. 14 shows the result. As illustrated, the abnormality degree remains substantially constant while the lithium bromide concentration is at a normal constant level, but with the start of contamination, the abnormality degree starts to lower, and this tendency continues for a period of time.

This tendency can be detected, for example, by storing in the memory 486 abnormality data of three periods Tb, Tm and Ta over a combined period of 90 minutes in the past, and comparing the average of abnormality degrees of the initial period Tb with the average of abnormality degrees of the last period Ta, such that when a reduction exceeding a predetermined value has occurred, this is interpreted as indicating contamination with the absorbent. The change of tendency is detectable by various methods.

The failure diagnosing system of the present invention properly detects the contamination of the refrigerant with the absorbent merely by monitoring the abnormality degree which is available only from the temperature data as to the evaporator without sampling the refrigerant or performing complex measurement or diagnosis with use of precision pressure gauges, whereby a fault in the chiller can be traced early.

Sixth Embodiment

The absorption chiller of FIG. 21 is so controlled that upon an abnormal rise of the liquid level of the absorbent in the high temperature generator 3, the absorbent pump 6 is stopped. With the absorbent pump at a stop, the operating state of the chiller changes from the normal operating state. This abnormal state also continues for a period of time after the pump 6 is started again.

For example in the high temperature generator 4, low temperature heat exchanger 5 or like heat exchange unit, usual heat exchange is not effected, and the logarithmic mean temperature difference exhibits an abnormal value, until the absorbent pump 6 at a stop is started again and for a period of time subsequent to the starting, i.e., while the pump 6 is not in a steady state.

If failure diagnosis is performed while the absorbent pump is in such a non-steady state, in the same manner as in the steady state, the result of diagnosis will be of low reliability; and if the result indicates a serious error, it is likely that the safety device operates to bring the chiller out of operation.

To avoid problems due to such reduced reliability of failure diagnosis, the present embodiment is adapted to nullify use of the measurement data for failure diagnosis or discontinue the diagnosis if the pump 6 is halted under control.

Figure 15:
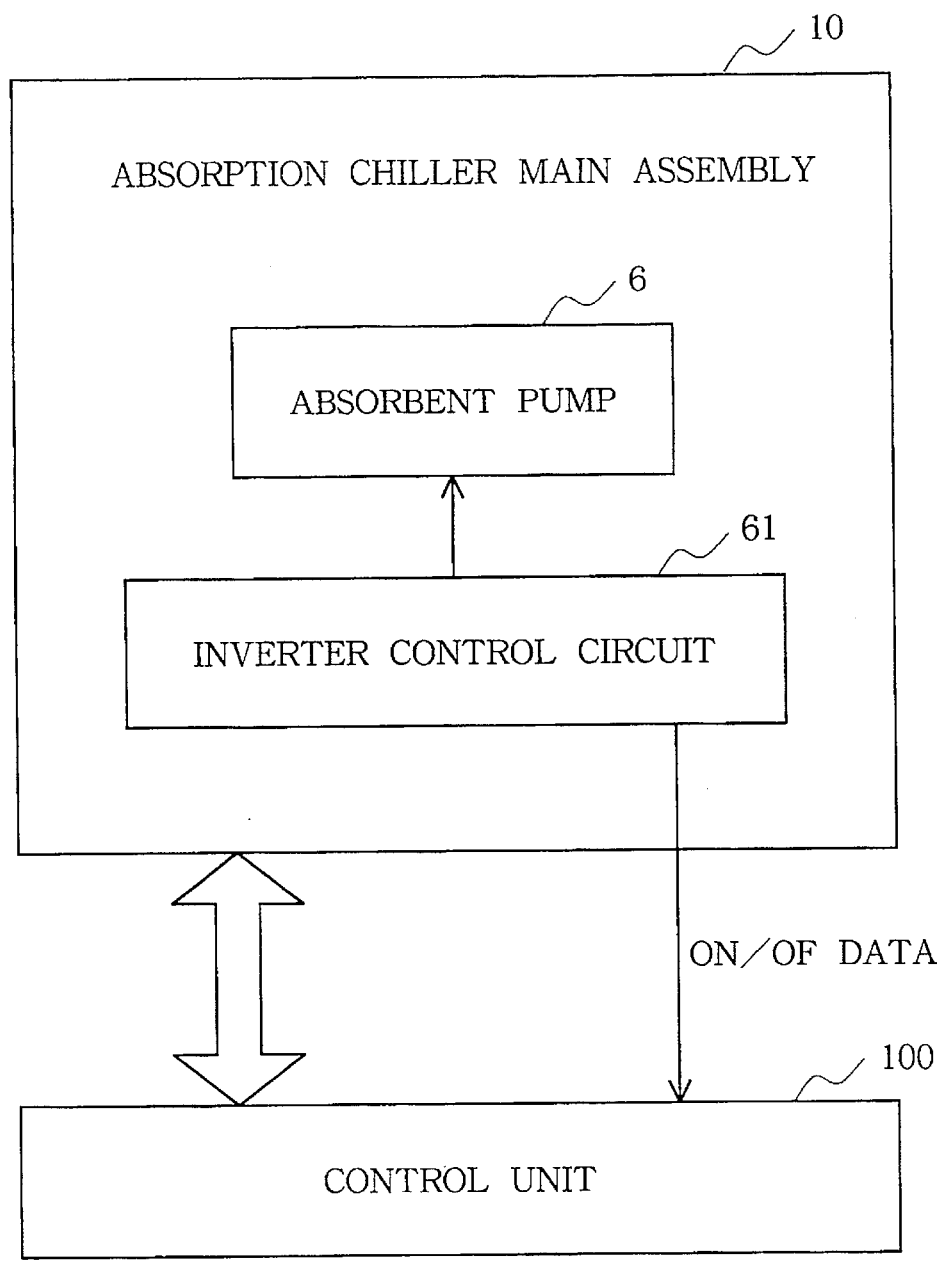
FIG. 15 is a block diagram showing the construction of a sixth embodiment.

According to the present embodiment which is shown in FIG. 15, the chiller main assembly 10 is controlled by a control unit 100 for cooling operation, and failure diagnoses are performed based on measurement data available from various portions of the chiller main assembly 10 and serving as failure identifying indices. The inlet and outlet temperature data is used, for example, for heat exchange units. Starting, stopping and speed of rotation of the pump 6 are controlled by an inverter control circuit 61 to maintain the absorbent in the high temperature generator 3 at a constant liquid level.

The inverter control circuit 61 further feeds on/off data indicating the operating state of the absorbent pump 6 to the control unit 100. When the pump 6 stopped is detected from the data, the failure diagnosing operation is discontinued until the pump 6 is started again and for the subsequent specified period.

Consequently, a highly reliable result only is obtained from failure diagnosis, and a proper procedure can be executed rapidly in the event of a failure.

Incidentally, it is possible to discontinue failure diagnosing and identifying processing and outputting of identification result, or to discontinue outputting of the result only, while the absorbent pump is held out of operation. In failure diagnosis involving measurement data moving average processing, it is also possible to neglect the measurement data available during the nonsteady-state period of the absorbent pump and to calculate a moving average based only on the measurement data of the other period for continued failure diagnosis.

Seventh Embodiment

The operation of temperature sensors generally involves an error (offset) due, for example, to the variation of resistance value of the material, so that the sensors are initially adjusted at a predetermined temperature (e.g., 20° C.). However, if the measuring temperature differs from the predetermined temperature, an offset will occur. Accordingly, when the measurement data obtained by the temperature sensor is used as it is for the failure diagnosis of the absorption chiller, the result is low in reliability.

In order to obtain accurate measurement data, it is desired that all temperature sensors as mounted on the chiller main assembly be adjusted to eliminate offsets, whereas the absorption chiller comprises a plurality of heat exchange units, which are each equipped with three or four temperature sensors, hence a very large number of sensors in total. It is therefore cumbersome and takes a long period of time to individually adjust all the temperature sensors.

To omit or simplify the offset adjustment of the individual temperature sensors according to the present embodiment, the offset of the temperature difference data is calculated before the abnormality detection of the heat exchange unit, the temperature difference data is corrected by an amount corresponding to the calculated offset, and the heat exchange unit is checked for abnormality detection based on the corrected data.

Figure 16:
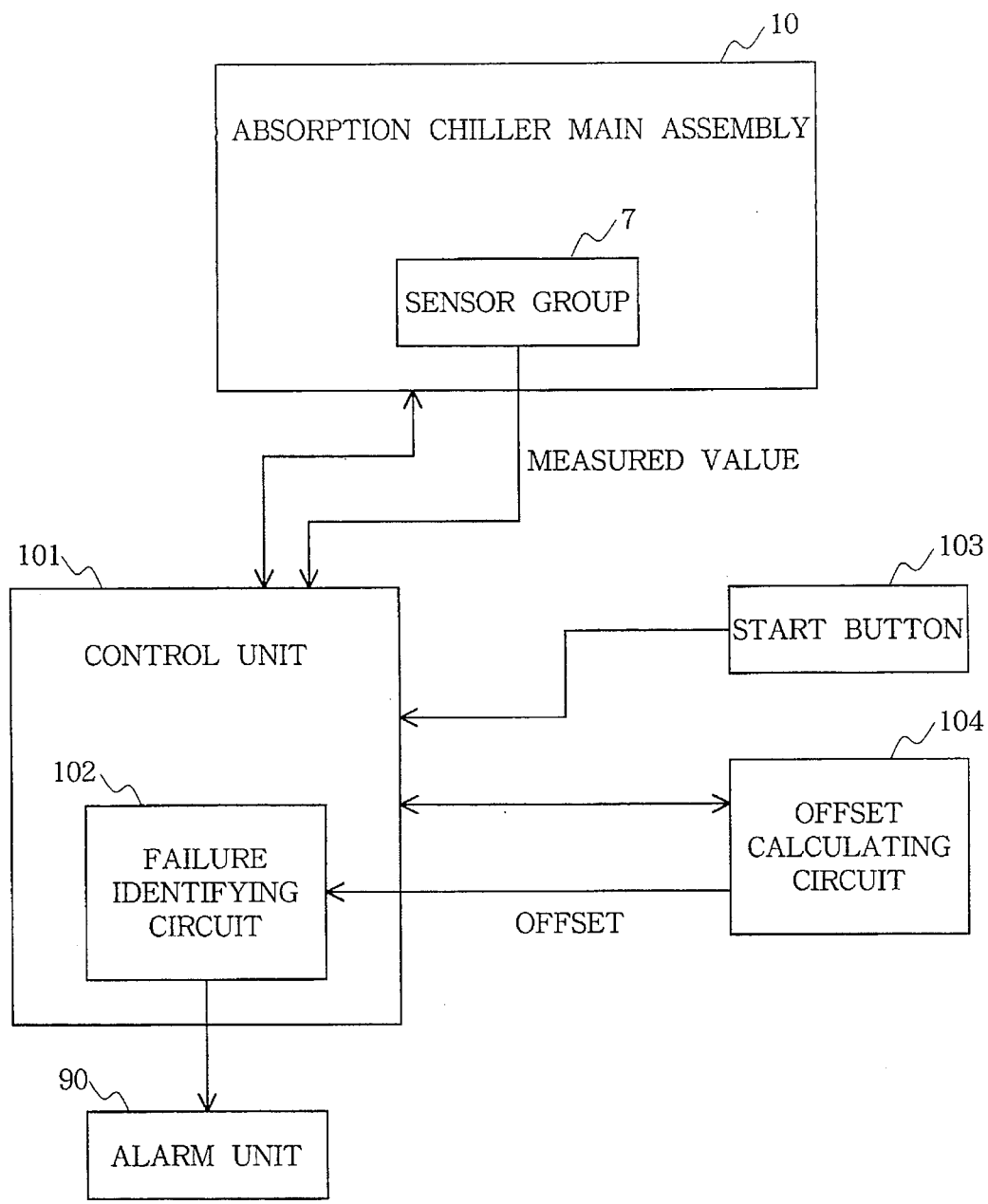
FIG. 16 is a block diagram showing the construction of a seventh embodiment.

According to the present embodiment which is shown in FIG. 16, the chiller main assembly 10 is provided with a group of sensors 7 for measuring temperatures and pressures at various portions. The measurement data obtained by the sensor group 7 is sent to a control unit 101 for use in controlling the main assembly 10.

The control unit 101 includes a failure identifying circuit 102 for identifying various abnormalities or failures based on the measurement data. The result of identification is output to a display, alarm, printer or like unit 90. The control unit 101 has connected thereto an offset calculating circuit 104 and a start button 103. When depressed, the start button 103 initiates the offset calculating circuit 104 into operation. The circuit calculates logarithmic mean temperature differences and the offset involved in amounts of heat exchange as will be described below. The calculated offset is fed to the failure identifying circuit 102 of the control unit 101 and used for calculation for failure identification.

For example, in the case where an abnormality of the high temperature heat exchanger 4, low temperature heat exchanger 5, condenser 11 or absorber 22 is to be detected, the relationship between the amount of heat exchange Q and the logarithmic mean temperature difference $\Delta T$ is checked. The difference $\Delta T$ can be expressed as the product of a coefficient of proportion k representing thermal resistance and the amount of heat exchange Q as expressed by Mathematical Expression 29. For example, the proportion coefficient k, if increasing abnormally, indicates soiling of the heat transfer surface or like abnormality.

Mathematical Expression 29:

$$\Delta T = k \times Q$$

However, in the case where the logarithmic mean temperature difference involves an error due to a temperature sensor offset, the relationship of Expression 29 will not be established and will result in low reliability if used for abnormality diagnosis.

Figure 17A:
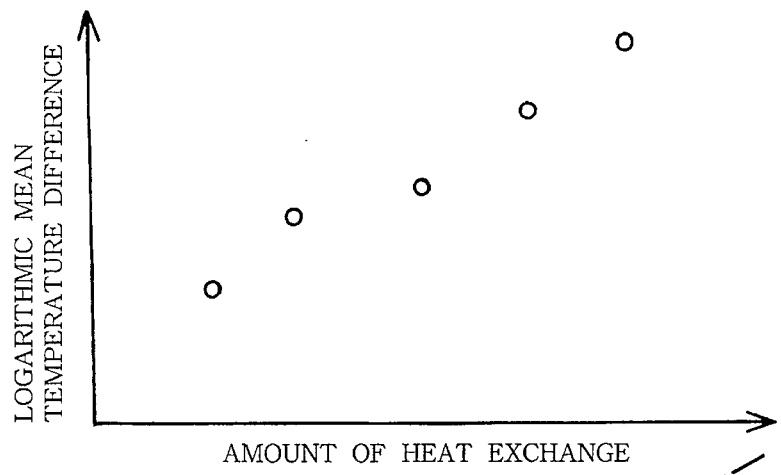
FIGS. 17(a), 17(b) and 17(c) are a series of graphs showing a procedure for determining an offset of the logarithmic mean temperature difference as related to the amount of heat exchange.
Figure 17B:
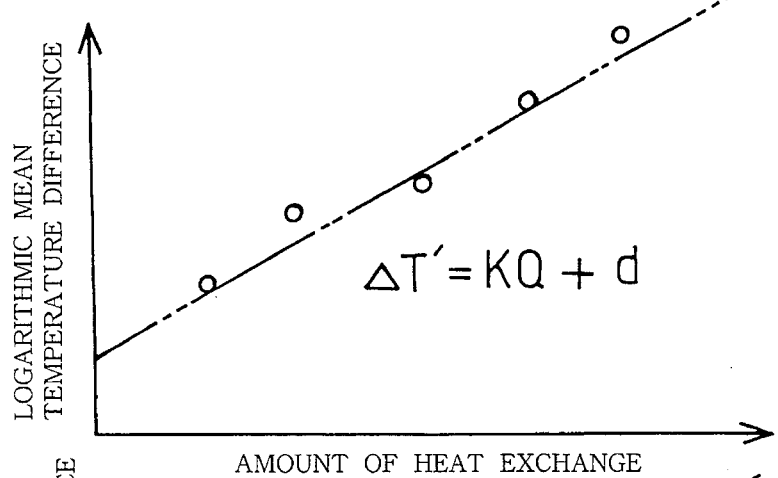

For example, when the logarithmic mean temperature difference is plotted as seen in FIG. 17(a) wherein the heat exchange amount is taken as abscissa vs. the mean temperature difference as ordinate, a linear relationship is obtained therebetween as seen in FIG. 17(b), whereas the line does not extend through the origin.

In this case, the logarithmic mean temperature difference $\Delta T'$ can be given by Mathematical Expression 30.

Mathematical Expression 30:

$$\Delta T' = k \times Q + d$$

wherein d is an offset. The offset d can be considered to be the combination of individual offset values of a plurality of temperature sensors for one heat exchange unit.

To calculate the offset d according to the present embodiment, logarithmic mean temperature differences are calculated while the amount of heat exchange varies, and the difference values are plotted as shown in FIG. 17(a). Next as shown in FIG. 17(b), a line having the slope of the known proportion coefficient k is used to approximate the variations of the logarithmic mean temperature difference. The coefficient k can be determined, for example, from the design specification of the heat exchange unit. Further the level of the line can be determined by least squares. When the number of data items available is sufficiently great, the slope k of the line can also be determined by least squares.

Figure 17C:
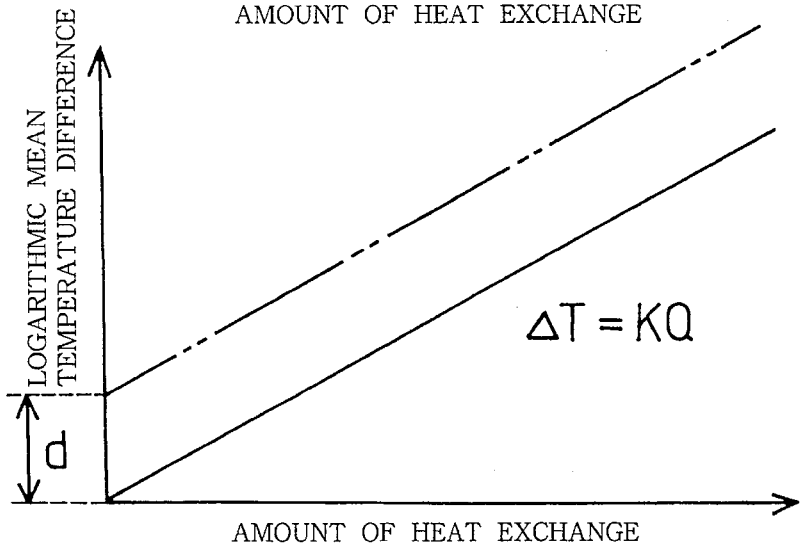

Subsequently, the intercept where the line (indicated by a broken line) cuts the axis of ordinates as shown in FIG. 17(c) is determined, and this value is taken as the offset d. Sliding the line by an amount corresponding to the offset gives a straight line extending through the origin as indicated by a solid line. This line becomes represented by Mathematical Expression 29 given above.

Thus, for abnormality detection, the offset adjustment for the individual temperature sensors is omitted, logarithmic mean temperature difference is calculated from measurement data from the temperature sensors, and the difference is corrected with the offset d.

With the system of FIG. 16, the logarithmic mean temperature difference of the heat exchange unit is automatically subjected to offset adjustment merely when the monitor depresses the start button 103, whereupon the system outputs an accurate result of failure identification. A proper measure can therefore be taken promptly in the event of a failure.

The temperature difference data providing indices for identifying abnormalities of the heat exchange unit can be simple temperature differences or temperature differences optionally defined as required, in addition to the logarithmic mean temperature difference.

Eighth Embodiment

Since abnormalities increase the concentration of the absorbent, it is practice to monitor the absorbent concentration to detect the degree of overall abnormality of the absorption chiller as previously stated. Especially, the rise in the concentration of the absorbent (concentrate) to be supplied from the low temperature generator 12 to the absorber 22 via the low temperature heat exchanger 22 directly causes crystallization of the absorbent, entailing the likelihood of cessation of operation of the chiller. The concentration of the absorbent is therefore used as an index in monitoring such abnormality. More specifically, the deviation of the concentrate concentration measurement from the corresponding normal value of concentrate concentration shown in FIG. 12 is calculated, and when the deviation has exceeded a predetermined criterion value, this can be interpreted as indicating occurrence of abnormality.

The cooling water flowing through the cooling water piping within the absorber 22 and the condenser 11 comes into contact with outside air while circulating through the cooling tower and therefore becomes inevitably contaminated with dust or like extraneous matter. Such extraneous matter adheres to the inner surface of the cooling water piping with the lapse of operating time to result in a lower heat transfer coefficient. The problem of such foul cooling water substantially differs from the problem of the contamination of the refrigerant or abnormal vacuum due to a failure of the chiller itself, so that it is reasonable to make distinction between the foulness of cooling water and the other abnormalities.

However, the conventional failure diagnosing system fails to distinguish the foulness of cooling water from the other causes and therefore encounters difficulty in ensuring proper failure diagnosis. Accordingly, the present embodiment excludes the influence of foulness of the cooling water when detecting concentrate concentration abnormalities.

In the absorption chiller, the cooling water passes through the absorber 22 and thereafter through the condenser 11. Accordingly, when the cooling water fouls, the resulting influence appears not only in the absorber 22 but also in the condenser 11. The condenser 11 is disposed in the upper shell 1 and separated from the absorber 22 of the lower shell 2 by a partition, so that an abnormal vacuum in the absorber 22 or the contamination of the refrigerant exerts no influence on the condenser 11. The abnormality of the condenser 11 is attributable predominantly to the foulness of the cooling water. In other words, the degree of abnormality of the condenser 11 is a proper index indicating the progress of foulness of the cooling water. With respect to the absorber 22, on the other hand, fouling of the cooling water lowers the heat transfer coefficient of the cooling water piping as previously stated, rendering the absorber 22 unable to produce a sufficient cooling effect to result in an increased concentrate concentration deviation. Thus, the variation in the abnormality degree of the condenser and the variation in the concentrate concentration deviation are related to each other in connection with the foulness of the cooling water, and there is a definite correlation therebetween.

Figure 20:
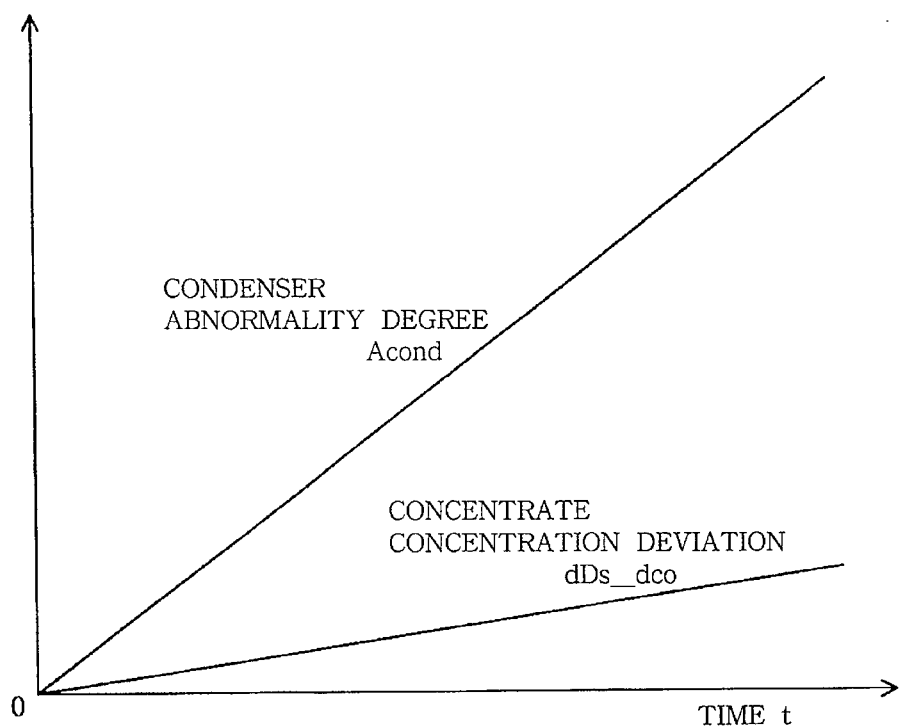
FIG. 20 is a graph showing the relationship between the condenser abnormality degree and the concentrate concentration deviation due only to the foulness of cooling water.

FIG. 20 shows the correlation qualitatively. It is seen that while the chiller is in operation with all the abnormalities other than the foulness of the cooling water excluded, the abnormality degree Acond of the condenser 11 and the conentrate concentration deviation dDs_dco increase in a definite ratio to each other with the lapse of time, i.e., with increasing foulness of the cooling water.

It therefore follows that the deviation of the concentrate concentration due only to the foulness of the cooling water can be estimated by multiplying the condenser abnormality degree by an appropriate correction coefficient.

According to the present embodiment, abnormality degree data representing the abnormality degree of the condenser 11 is calculated, and the concentrate concentration deviation is modified in accordance with the magnitude of the data. The amount of modification of the data can be calculated, for example, by multiplying the condenser abnormality degree data by a correction coefficient. In this case, the amount of modification is subtracted from the concentrate concentration deviation to obtain a modified concentrate concentration.

As represented by Mathematical Expression 31 given below, the modified concentrate concentration deviation dDs' is obtained generally by subtracting the concentrate concentration deviation dDs_dco due only to the cooling water foulness from the concentrate concentration deviation dDs obtained by measurement.

Mathematical Expression 31:

$$dDs'=dDs-dDs\_dco$$

The deviation dDs_dco can be defined as a function f of the condenser abnormality degree Acond as represented by Mathematical Expression 32. The function is predetermined experimentally.

Mathematical Expression 32:

$$dDs\_dco=f(Acond)$$

Figure 19:
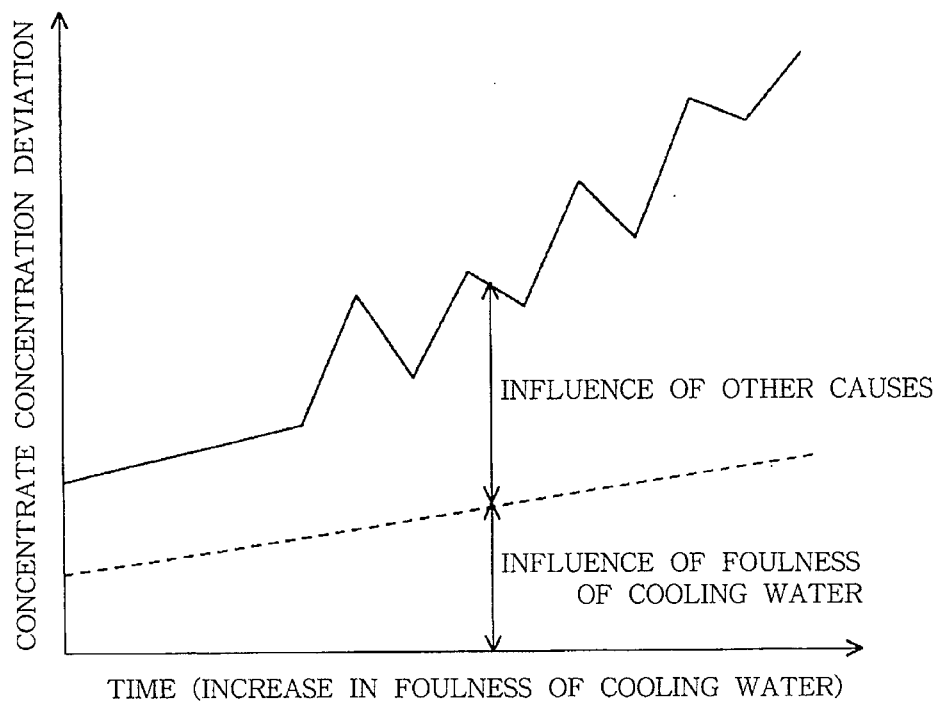
FIG. 19 is a graph showing the influence of foul cooling water and the influence of other causes which are involved in the concentrate concentration deviation.

FIG. 19 shows variations in the concentrate concentration deviation resulting from the foulness of the cooling water and other abnormalities to illustrate the influence of the foulness and the influence of other causes which influences are involved in the variations. The influence of the causes other than the water foulness can be quantitatively determined by subtracting from the concentration deviation the influence of the water foulness calculated from Mathematical Expression 32 given above.

With the present embodiment which is shown in FIG. 18, various items of measurement data obtained by the sensor group 7 are fed to an arithmetic unit 590 comprising a microcomputer for abnormality detection and failure identification as will be described below. The result is output to a display unit 9.

The arithmetic unit 590 comprises the calculating circuits 581 to 589 and abnormality detecting circuit 580 to be described below and each comprising a computer program. The calculating circuit 581 calculates the temperature of upper shell saturated vapor, Tcond, from the internal pressure Pup of the upper shell obtained by an upper shell pressure sensor 702 using Mathematical Expression 33.

Mathematical Expression 33:

$$Tcond=[-b+\{b^2-4\cdot c\cdot(a-\ln Pup)\}^{0.5}]/\{2\cdot(a-\ln Pup)\}-237.0$$

wherein a, b and c are constants and are 8.0509, −1685.1 and −90991, respectively.

The circuit 582 uses Mathematical Expression 34 for calculating the logarithmic mean temperature difference ΔTcond of the condenser 11 from the upper shell saturated vapor temperature Tcond obtained by the circuit 581, cooling water outlet temperature Tco_out obtained by the sensor 70 and cooling water intermediate temperature Tco_mid obtained by the sensor Mathematical Expression 34:

$$\Delta Tcond=\{(Tcond-Tco\_mid)+(Tcond-Tco\_out)\}/ln\{(Tcond-Tco\_mid)/(Tcond-Tco\_out)\}$$

The circuit 583 calculates the refrigeration load L from the cold water flow rate Vc obtained by the sensor 78, cold water outlet temperature T_out obtained by the sensor 77 and cold water inlet temperature T_in obtained by the sensor 76 using Mathematical Expression 35.

Mathematical Expression 35:

$$L=Vc\times(T\_in-T\_out)$$

The circuit 584 calculates the normal value ΔTcond_n of logarithmic temperature difference of the condenser 11 from the refrigeration load L obtained by the circuit 583, using Mathematical Expression 36.

Mathematical Expression 36:

$$\Delta Tcond\_n=A\times L$$

wherein A is a constant dependent on the characteristics of the absorption chiller and is determined experimentally.

The circuit 585 estimates the concentrate concentration Ds from the temperature Ts_hi of the low temperature generator obtained by a low temperature generator temperature sensor 701 and the upper shell saturated vapor temperature Tcond obtained by the circuit 581, using Mathematical Expression 37.

Mathematical Expression 37:

$$Ds = \{(Ts\_hi - 283.0) \times 139.0\}/(Tcond + 273.0) - 102.4$$

The circuit 586 calculates the normal value Ds_n of concentrate concentration from the cooling water inlet temperature Tco_in obtained by the sensor 71 and the refrigeration load L obtained by the circuit 583, using the graph of FIG. 12.

The graph of FIG. 12 shows quadratic functions providing approximations of variations in the concentrate concentration at different cooling water inlet temperatures, and is used for calculating concentrate concentrations at an optional cooling water inlet temperature by interpolation.

The circuit 587 calculates the abnormality degree Acond of the condenser 11 from the logarithmic mean temperature difference ΔTcond of the condenser 11 obtained by the circuit 582 and the normal value ΔTcond_n of logarithmic mean temperature difference of the condenser 11 obtained by the circuit 584, using Mathematical Expression 38.

Mathematical Expression 38:

$$Acond = (\Delta Tcond - \Delta Tcond\_n)/\Delta Tcond\_n$$

The circuit 588 calculates the concentrate concentration deviation dDs from the concentrate concentration Ds obtained by the estimating circuit 585 and the normal value Ds_n of concentrate concentration obtained by the circuit 586, using Mathematical Expression 39.

Mathematical Expression 39:

$$dDs = Ds - Ds\_n$$

The circuit 589 calculates the modified concentrate concentration deviation dDs' from the concentrate concentration deviation dDs obtained by the circuit 588 and the condenser abnormality degree Acond obtained by the circuit 587, using Mathematical Expression 40.

Mathematical Expression 40:

$$dDs' = dDs - k \times Acond$$

wherein k is the ratio of the concentration deviation dDs_dco due only to the cooling water foulness to the condenser abnormality degree Acond (e.g., k=0.01), and is predetermined experimentally.

The abnormality detecting circuit 580 compares the modified concentrate concentration deviation dDs' obtained by the circuit 589 with a specified threshold value to prepare an abnormality signal representing the degree of abnormality other than the foulness of cooling water, and feeds the signal to the display unit 9.

For example, the result to be displayed is as follows.
When dDs'<t1, "normal".
When t1≦dDs'≦t2, "slightly abnormal".
When dDs'>t2, "abnormal".

In these inequalities, t1 and t2 are specified threshold values.

Since the concentrate concentration deviation obtained is free from the influence of the foulness of the cooling water, use of the deviation as an index enables the failure diagnosing system to perform a proper failure diagnosis.

The modification expression for the concentrate concentration is not limited to Expression 40 but can be other linear or quadratic expression.

The foregoing embodiments are intended to illustrate the present invention and should not be contruded as limiting the invention as defined in the appended claims or reducing the scope thereof. The components of the present system are not limited to those of the embodiments in construction but can of course be modified variously without departing from the spirit of the invention set forth in the claims.

Some of the above eight embodiments can be combined into a single failure diagnosing system to ensure more reliable diagnoses. For example, each of the first to the fifth embodiments can be combined with one of the sixth to the eigth embodiments.

What is claimed is:

1. A failure diagnosing system for an absorption chiller comprising a plurality of heat exchange units including a regenerator, condenser, evaporator and absorber, the failure diagnosing system comprising:

temperature measuring means for measuring at least one representative temperature of each of two fluids participating in heat exchange at a specified heat exchange unit, temperature difference data calculating means for storing a temperature difference data calculating equation comprising a linear expression containing the representative temperatures of the two fluids as its factors and using the calculating equation to calculate actual temperature difference data from the measurement data obtained by the temperature measuring means, heat exchange amount deriving means for deriving by measuring and calculation the amount of heat exchange by the specified heat exchange unit or other amount of heat exchange which varies with said amount of heat exchange, storage means having stored therein ideal temperature difference data for normal operation as related to the amount of heat exchange, and abnormality identifying means for preparing abnormality data indicating an abnormality of the specified heat exchange unit by comparing the actual temperature difference data obtained by the temperature difference calculating means with the ideal temperature difference data for the same amount of heat exchange as the amount of heat exchange obtained by the deriving means.

2. A failure diagnosing system as defined in claim 1 wherein the heat exchange amount deriving means calculates the amount of heat exchange by the absorber based on the temperature of cooling water at the inlet and outlet of the absorber and the flow rate of the cooling water.

3. A failure diagnosing system as defined in claim 1 wherein the heat exchange amount deriving means calculates the amount of heat exchange by the evaporator based on the temperature of cold water at the inlet and outlet of the evaporator and the flow rate of the cold water.

4. A failure diagnosing system as defined in claim 1 wherein the abnormality identifying means calculates an abnormality degree A defined by the mathematical expression $$A = (Tm - Tan)/Tan$$

using the actual temperature difference data Tm and the ideal temperature difference data Tan as variables, and outputs the abnormality degree A as the abnormality data.

5. A failure diagnosing system as defined in claim 1 wherein means is provided for nullifying abnormality identification by the abnormality identifying means when an absorbent pump for recycling an absorbent through the generator and the absorber has come to a halt.

6. A failure diagnosing system as defined in claim 1 wherein the temperature difference data calculating means has means for calculating an offset of temperature difference data as to the specified heat exchange unit, and means for correcting the result of calculation of the temperature difference data based on the calculated offset, and the corrected temperature difference data is fed to the abnormality identifying means as the actual temperature difference data.

7. A failure diagnosing system for an absorption chiller which system comprises:

sensor means for measuring the temperature of a plurality of fluids participating in heat exchange in a condenser and an absorber, an arithmetic circuit for calculating condenser abnormality degree data and absorber abnormality degree data representing the abnormality degree of the condenser and that of the absorber by calculating condenser temperature difference data and absorber temperature difference data representing the mean temperature differences of the fluids through the respective condenser and absorber based on measurement data obtained by the sensor means and comparing each of these items of data with a corresponding normal value, absorber abnormality degree modifying means for modifying the calculated absorber abnormality degree data in accordance with the magnitude of the calculated condenser abnormality degree data, and failure identifying means for identifying a failure of the absorber based on the modified absorber abnormality degree data.

8. A failure diagnosing system as defined in claim 7 wherein the temperature difference data is a logarithmic mean temperature difference, and the abnormality degree data is an abnormality degree A defined by the mathematical expression $$A=(\Delta T - \Delta Tn)/\Delta Tn$$

wherein ΔT and ΔTn are a measured value of logarithmic mean temperature difference and a normal value thereof, respectively, as variables.

9. A failure diagnosing system as defined in claim 7 wherein the arithmetic circuit comprises means for calculating an offset of the temperature difference data as to each of the condenser and the absorber, and means for correcting the result of calculation of the temperature difference data based on the calculated offset, and calculates the condenser abnormality degree data and the absorber abnormality degree data each based on the corrected temperature difference data.

10. A failure diagnosing system for an absorption chiller comprising:

sensor means for detecting the temperature of an absorbent flowing toward an absorber, the condensation temperature of a refrigerant in a condenser and the temperature of cooling water flowing through the absorber and the condenser, storage means having stored therein temperature correction data in accordance with the difference between the saturated vapor temperature of the condenser and the refrigerant condensation temperature using the cooling water temperature as a variable, temperature correcting means for retrieving the temperature correction data from the storage means in accordance with the cooling water temperature obtained from the sensor means and correcting the refrigerant condensation temperature obtained from the sensor means with the retrieved temperature correction data, concentration estimating means for estimating the concentration of the absorbent based on the refrigerant condensation temperature corrected by the temperature correcting means and the absorbent temperature obtained from the sensor means, and abnormality identifying means for detecting occurrence of an abnormality based on the estimated concentration obtained from the concentration estimating means.

11. A failure diagnosing system as defined in claim 10 wherein the abnormality identifying means comprises calculation means for deriving a normal value of absorbent concentration based on a refrigeration load and cooling water temperature, and prepares and outputs diagnosis data representing the degree of the abnormality in accordance with the magnitude of the difference between the estimated concentration and the normal value of concentration obtained from the calculation means.

12. A failure diagnosing system as defined in claim 10 wherein the abnormality identifying means comprises:

means for calculating abnormality degree data representing the degree of abnormality of the condenser by calculating temperature difference data representing the mean temperature difference between the refrigerant and the cooling water to be subjected to heat exchange in the condenser from temperature measurement data as to the refrigerant and the cooling water and comparing the temperature difference data with a corresponding normal value, means for calculating the deviation of the estimated concentration obtained from the concentration estimating means from a corresponding normal value, and means for modifying the calculated concentration deviation in accordance with the magnitude of the calculated condenser abnormality degree data, and detects occurrence of the abnormality based on the modified concentration deviation.

13. A failure diagnosing system for an absorption chiller comprising:

sensor means for detecting a refrigeration load and the temperature of cooling water flowing through an absorber and a condenser, concentration detecting means for detecting the concentration of an absorbent flowing toward the absorber by actual measurement or measurement including estimation, storage means having stored therein concentration characteristics representing variations in the concentration of the absorbent during normal operation using the refrigeration load and the cooling water temperature as variables, calculation means for deriving a normal value of concentration of the absorbent from the concentration characteristics in the storage means based on the refrigeration load and the cooling water temperature obtained from the sensor means, and abnormality identifying means for comparing the concentration detected by the concentration detecting means with the normal value of concentration derived by the calculation means and detecting occurrence of an abnormality based on the result of comparison.

14. A failure diagnosing system as defined in claim 13 wherein the sensor means further detects the condensation temperature of a refrigerant in the condenser, and the concentration detecting means comprises:

storage means having stored therein temperature correction data in accordance with the difference between the saturated vapor temperature of the condenser and the refrigerant condensation temperature using the cooling water temperature as a variable, temperature correcting means for retrieving the temperature correction data from the storage means in accordance with the cooling water temperature obtained from the sensor means and correcting the refrigerant condensation temperature with the retrieved temperature correction data, and concentration estimating means for estimating the concentration of the absorbent based on the refrigerant condensation temperature corrected by the temperature correcting means and the absorbent temperature detected by the sensor means.

15. A failure diagnosing system as defined in claim 13 wherein the abnormality identifying means comprises:

means for calculating abnormality degree data representing the degree of abnormality of the condenser by calculating temperature difference data representing the mean temperature difference between a refrigerant and the cooling water to be subjected to heat exchange in the condenser from the temperature measurement data as to the refrigerant and the cooling water and comparing the temperature difference data with a corresponding normal value, means for calculating the deviation of the detected concentration from the derived normal value of concentration, and means for modifying the calculated concentration deviation in accordance with the magnitude of the calculated condenser abnormality degree data, and detects occurrence of the abnormality based on the modified concentration deviation.

16. A failure diagnosing system for an absorption chiller characterized in that the system comprises:

measuring means for obtaining the temperature of a refrigerant recycled through an evaporator, the temperature of cold water at the inlet and outlet of the evaporator and the flow rate of the cold water by acutal measurement or measurement including estimation, first calculation means for calculating a refrigeration load from values measured by the measuring means, second calculation means for calculating the logarithmic mean temperature difference of the evaporator from the refrigeration load and the cold water inlet and outlet temperatures obtained by the measuring means, third calculation means for calculating a normal value of logarithmic mean temperature difference of the evaporator based on the refrigeration load obtained by the first calculation means, fourth calculation means for calculating the degree of abnormality of the evaporator by normalizing the logarithmic mean temperature difference obtained from the second calculation means with the normal value obtained from the third calculation means, memory means for storing variations in the abnormality degree of the evaporator obtained by the fourth calculation means with time over a specified period in the past, and diagnosing means for detecting a change of the tendency for the abnormality degree to vary with time to a different tendency at a certain time, from the abnormality degree history stored in the memory means to thereby recognize that the refrigerant was contaminated with the absorbent at said time.

17. A failure diagnosing system as defined in claim 16 wherein the second calculation means comprises means for calculating an offset of the logarithmic mean temperature difference of the evaporator, and means for correcting the result of calculation of the evaporator logarithmic mean temperature difference based on the calculated offset, and the fourth calculation means calculates the abnormality degree of the evaporator based on the corrected logarithmic mean temperature difference.

* * * * *